(12) United States Patent
Nakao et al.

(10) Patent No.: US 11,245,291 B2
(45) Date of Patent: Feb. 8, 2022

(54) NON-CONTACT POWER SUPPLY DEVICE CAPABLE OF PERFORMING CONSTANT VOLTAGE OUTPUT OPERATION

(71) Applicant: Omron Corporation, Kyoto (JP)

(72) Inventors: Goro Nakao, Inazawa (JP); Yusuke Kawai, Ichinomiya (JP); Toshiyuki Zaitsu, Kyotanabe (JP)

(73) Assignee: Omron Corporation, Kyoto (JP)

( * ) Notice: Subject to any disclaimer, the term of this patent is extended or adjusted under 35 U.S.C. 154(b) by 31 days.

(21) Appl. No.: 16/612,203

(22) PCT Filed: Apr. 20, 2018

(86) PCT No.: PCT/JP2018/016361
§ 371 (c)(1),
(2) Date: Nov. 8, 2019

(87) PCT Pub. No.: WO2018/211912
PCT Pub. Date: Nov. 22, 2018

(65) Prior Publication Data
US 2021/0143675 A1 May 13, 2021

(30) Foreign Application Priority Data
May 19, 2017 (JP) .............................. JP2017-100158

(51) Int. Cl.
*H02J 50/80* (2016.01)
*H02J 50/12* (2016.01)
*H04B 5/00* (2006.01)

(52) U.S. Cl.
CPC .............. *H02J 50/80* (2016.02); *H02J 50/12* (2016.02); *H04B 5/0037* (2013.01); *H04B 5/0093* (2013.01)

(58) Field of Classification Search
CPC . H02J 50/00; H02J 50/12; H02J 50/80; H04B 5/00
See application file for complete search history.

(56) References Cited

U.S. PATENT DOCUMENTS 5,768,111 A * 6/1998 Zaitsu ..................... H02M 3/28
310/316.01
5,805,432 A * 9/1998 Zaitsu ..................... H02M 1/34
363/16

(Continued)

FOREIGN PATENT DOCUMENTS

JP 2010136464 A 6/2010
JP 2013215065 A 10/2013
(Continued)

OTHER PUBLICATIONS

Watanabe et al., "Bidirectional Contactless Power Transfer System expandable from Unidirectional Systems", The transactions of the Institute of Electrical Engineers of Japan. D, IEEJ Transactions on Industry Applications, pp. 343-344, 2012 (3 pages).

(Continued)

*Primary Examiner* — Adi Amrany
(74) *Attorney, Agent, or Firm* — Osha Bergman Watanabe & Burton LLP

(57) ABSTRACT

A power transmission device 2 for a non-contact power supply device 1 has a transmission coil 14 and a power supply circuit 10 that supplies, to the transmission coil 14, AC power having a switching frequency at which the transmission coil 14 does not resonate. In addition, a power reception device 3 for the non-contact power supply device 1 has: a resonance circuit 20 that has a reception coil 21 and a resonance capacitor 22 resonating in parallel and a first coil 23 connected in series or parallel to the reception coil 21; and a coil 23 connected in series to the reception coil 21.

7 Claims, 17 Drawing Sheets

(56) References Cited

U.S. PATENT DOCUMENTS

| | | | | |
|---|---|---|---|---|
| 5,969,954 | A * | 10/1999 | Zaitsu | H02M 3/337 363/16 |
| 9,561,730 | B2 * | 2/2017 | Widmer | B60L 50/66 |
| 10,250,065 | B2 * | 4/2019 | Chou | H02J 50/12 |
| 2008/0303479 | A1 * | 12/2008 | Park | H02J 50/90 320/108 |
| 2011/0169446 | A1 * | 7/2011 | Kondo | H02J 50/10 320/108 |
| 2013/0188397 | A1 * | 7/2013 | Wu | H02M 7/53871 363/17 |
| 2013/0301306 | A1 * | 11/2013 | Hosotani | H02M 3/338 363/21.02 |
| 2014/0203774 | A1 * | 7/2014 | Sawayanagi | H02J 50/10 320/108 |
| 2015/0015081 | A1 | 1/2015 | Usami | |
| 2015/0015197 | A1 * | 1/2015 | Mi | B60L 53/122 320/108 |
| 2016/0043562 | A1 * | 2/2016 | Lisi | H02J 7/0047 307/104 |
| 2016/0064951 | A1 * | 3/2016 | Yamamoto | H02J 50/20 307/104 |
| 2016/0226312 | A1 * | 8/2016 | Suzuki | H02J 7/025 |
| 2017/0222488 | A1 * | 8/2017 | Madawala | H02J 50/12 |
| 2019/0348866 | A1 * | 11/2019 | Madawala | H02J 50/12 |

FOREIGN PATENT DOCUMENTS

| | | |
|---|---|---|
| JP | 2015019531 A | 1/2015 |
| JP | 2015042051 A | 3/2015 |
| JP | 201705790 A | 1/2017 |
| WO | 2014038379 A1 | 3/2014 |

OTHER PUBLICATIONS

International Search Report issued in International Application No. PCT/JP2018/016361, dated Jun. 12, 2018 (4 pages).

International Preliminary Report on Patentability issued in International Application No. PCT/JP2018/016361; dated Apr. 19, 2019 (18 pages).

Written Opinion issued in International Application No. PCT/JP2018/016361; dated Jun. 12, 2018 (10 pages).

Notice of Reasons for Refusal issued in Japanese Application No. 2017-100158, dated May 11, 2021 (8 pages).

* cited by examiner

NON-CONTACT POWER SUPPLY DEVICE CAPABLE OF PERFORMING CONSTANT VOLTAGE OUTPUT OPERATION

FIELD

The present invention relates to a non-contact power supply device.

BACKGROUND

Conventionally, technologies for transmitting electric power through space without using metal contacts or the like, or so-called non-contact power supply (also called wireless power supply) technologies have been studied.

As one of non-contact power supply technologies, a method of supplying power by electromagnetic induction is known. In the method of supplying power by electromagnetic induction, a series-primary parallel-secondary capacitors method (hereinafter referred to as an SP method) is used (see, for example, NPL 1). According to the SP method, a capacitor is connected in series with a transmission coil serving as a part of a transformer on the primary side (power transmission side), and a capacitor is connected in parallel with a reception coil serving as another part of the transformer on the secondary side (power reception side).

In the SP method, since the resonance circuit constituted by the reception coil and the capacitor on the power reception side causes parallel resonance, the output from the resonance circuit is constant current output. Thus, it is generally more difficult to perform control in the SP method than in a series-primary series-secondary capacitors method (hereinafter referred to as an SS method), in which output on the power reception side is constant voltage output. This is because electronic appliances are generally controlled by constant voltage.

In addition, a technology of, in the SP method, disposing a reactor that is connected in series with the coil in the resonance circuit on the power reception side has been proposed (see, for example, NPL 1 and PTL 1). Note that the method using the technology is sometimes referred to as an SPL method. The method is also referred to as the SPL method herein.

CITATION LIST

Patent Literature

[PTL 1] Japanese Unexamined Patent Publication (Kokai) No. 2015-42051

Non-Patent Literature

[NPL 1] Watanabe et al., "Bidirectional Contactless Power Transfer System expandable from Unidirectional Systems", The transactions of the Institute of Electrical Engineers of Japan. D, IEEJ Transactions on Industry Applications, Vol. 133, No. 7, pp. 707-713, 2013

SUMMARY

Technical Problem

In a non-contact power supply device in which the SPL method is employed, since harmonic components of transmitted power are reduced and ideal transformer properties are obtained, a power factor is improved and, as a result, power transmission efficiency increases.

It is preferable that, even when the SPL method is employed, the non-contact power supply device be used in such a way as to perform a constant voltage output operation. Further, depending on the use, an adjustable range of frequency of AC power supplied to the transmission coil is sometimes restricted even when the coupling coefficient between a transmission coil and a reception coil is not constant. In such a case, it is preferable that variation in the resonance frequency of the resonance circuit including the reception coil due to change in the coupling coefficient be suppressed.

Accordingly, an object of the present invention is to provide a non-contact power supply device that is capable of suppressing variation in the resonance frequency of the resonance circuit of the device on the reception side due to change in the coupling coefficient between the transmission coil of the device on the power transmission side and the reception coil of the device on the power reception side.

Solution to Problem

As an embodiment of the present invention, a non-contact power supply device including a power transmission device and a power reception device to which power is transmitted from the power transmission device without contact is provided. In the non-contact power supply device, the power transmission device includes a transmission coil that supplies power to the power reception device and a power supply circuit that supplies AC power having an adjustable switching frequency at which the transmission coil does not resonate and having an adjustable voltage to the transmission coil. On the other hand, the power reception device includes a resonance circuit that includes a reception coil that receives power from the power transmission device, a resonance capacitor that is connected in parallel with the reception coil, and a first coil that is connected in series or in parallel with the reception coil, a rectification circuit that rectifies power output from the resonance circuit, and a second coil that is connected in series with the reception coil between the resonance circuit and the rectification circuit.

In the non-contact power supply device, the first coil included in the resonance circuit of the power reception device is preferably not coupled with the transmission coil even while power is transmitted from the power transmission device to the power reception device.

In addition, in the non-contact power supply device, the power transmission device preferably further includes a third coil that is connected in series with the transmission coil.

In addition, in the non-contact power supply device, the power reception device preferably further includes a voltage detection circuit that measures the output voltage of power output from the resonance circuit and obtains a measured value of the output voltage, a constant voltage determination circuit that determines, on the basis of the measured value of the output voltage, whether or not the non-contact power supply device is performing a constant voltage output operation and whether or not a measured value of the output voltage falls within a predetermined allowance range of voltage, and a transmitter that transmits a signal including determination information indicating whether or not the non-contact power supply device is performing a constant voltage output operation and whether or not the measured value of the output voltage falls within the predetermined allowance range of voltage to the power transmission device. In addition, the power transmission device preferably further includes a receiver that receives a signal including the determination information and a control circuit that controls switching frequency and voltage of the AC power supplied from the power supply circuit to the transmission coil, depending on the determination information.

Further, in the non-contact power supply device, when the determination information indicates that the non-contact power supply device is not performing a constant voltage output operation, the control circuit of the power transmission device preferably controls the switching frequency of the AC power supplied from the power supply circuit to the transmission coil in such a way that measured values of the output voltage do not change even when the resistance of a load circuit connected to the rectification circuit of the power reception device changes.

In addition, in this case, when the determination information indicates that the non-contact power supply device is performing a constant voltage output operation and the measured value of the output voltage does not fall within the predetermined allowance range of voltage, the control circuit of the power transmission device preferably controls the voltage of the AC power supplied from the power supply circuit to the transmission coil in such a way that measured values of the output voltage fall within the allowance range.

Alternatively, in the non-contact power supply device, the power supply circuit can adjust switching frequency and voltage of AC power supplied to the transmission coil, and the power transmission device preferably further includes a current detection circuit that measures current flowing through the transmission coil and obtains a measured value of the current and a control circuit that controls the switching frequency and voltage of the AC power supplied from the power supply circuit to the transmission coil, depending on the measured value of the current.

In this case, the control circuit of the power transmission device preferably monitors measured values of the current while changing the switching frequency and thereby detects a switching frequency at which measured values of the current have a local maximum and controls the power supply circuit in such a way that AC power having the detected switching frequency is supplied to the transmission coil.

In addition, according to another embodiment of the present invention, a non-contact power supply device including a power transmission device and a power reception device to which power is transmitted from the power transmission device without contact is provided. In the non-contact power supply device, the power reception device includes a resonance circuit that includes a reception coil that receives power from the power transmission device and a resonance capacitor that is connected in parallel with the reception coil, a rectification circuit that rectifies power output from the resonance circuit, and a first coil that is connected in series with the reception coil between the resonance circuit and the rectification circuit. On the other hand, the power transmission device includes a transmission coil that supplies power to the power reception device, a second coil that is connected in series with the transmission coil and is not coupled with the reception coil even while power is transmitted from the power transmission device to the power reception device, and a power supply circuit that supplies AC power having an adjustable switching frequency at which the transmission coil does not resonate and having an adjustable voltage to the transmission coil.

In the non-contact power supply device, the power reception device preferably further includes a voltage detection circuit that measures the output voltage of power output from the resonance circuit and obtains a measured value of the output voltage, a constant voltage determination circuit that determines, on the basis of the measured value of the output voltage, whether or not the non-contact power supply device is performing a constant voltage output operation and whether or not the measured value of the output voltage from the resonance circuit falls within a predetermined allowance range of voltage, and a transmitter that transmits a signal including determination information indicating whether or not the non-contact power supply device is performing a constant voltage output operation and whether or not the measured value of the output voltage from the resonance circuit falls within the predetermined allowance range of voltage to the power transmission device. On the other hand, the power transmission device preferably further includes a receiver that receives the signal including the determination information and a control circuit that controls switching frequency and voltage of the AC power supplied from the power supply circuit to the transmission coil, depending on the determination information.

Advantageous Effects of Invention

A non-contact power supply device according to the present invention has an advantageous effect of suppressing variation in the resonance frequency of the resonance circuit of the device on the reception side due to change in the coupling coefficient between the transmission coil of the device on the power transmission side and the reception coil of the device on the power reception side.

DESCRIPTION OF EMBODIMENTS

A non-contact power supply device according to an embodiment of the present invention will be described below with reference to the drawings.

First, to facilitate understanding of the non-contact power supply device according to the present invention, constant voltage output operation performed by the non-contact power supply device according to the SPL method will be described.

Figure 1:
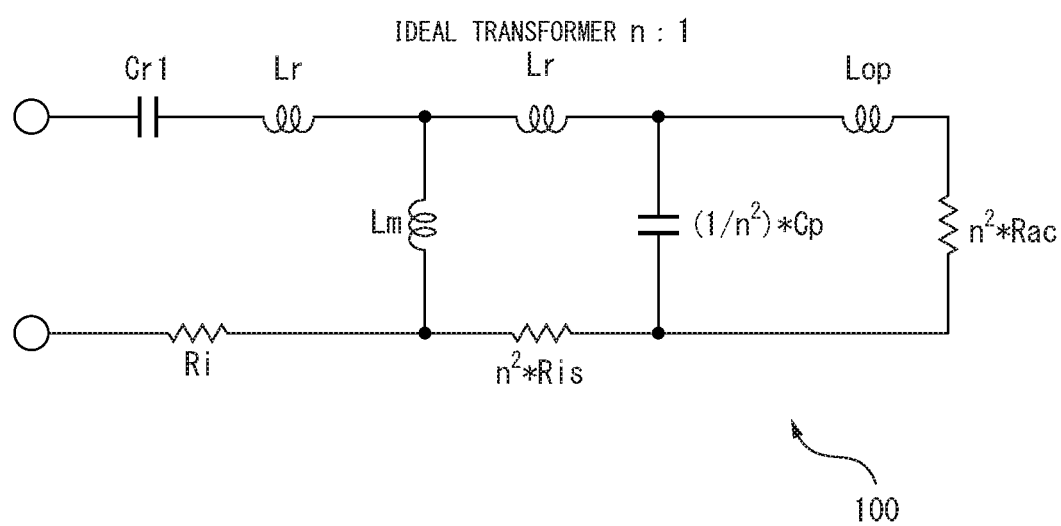
FIG. 1 is an equivalent circuit diagram of a non-contact power supply device according to an SPL method.

FIG. 1 is an equivalent circuit diagram of the non-contact power supply device according to the SPL method. It is assumed that, in an equivalent circuit 100 in the diagram, a transmission coil of a resonance circuit on the power transmission side couples with a reception coil of a resonance circuit on the power reception side to form an ideal transformer with a ratio of n:1. Cr1 is capacitance of a capacitor connected in series with the transmission coil in the resonance circuit on the power transmission side. Lr and Lm are leakage inductance and excitation inductance, respectively, of the resonance circuit on the power transmission side. Note that inductance Lp of the transmission coil of the resonance circuit on the power transmission side is equal to (Lm+Lr) and, when it is assumed that a coupling coefficient between the transmission coil and the reception coil is denoted by k, Lr=(1−k)Lp and Lm=kLp hold. In addition, Ri and Ris are a winding resistance on the power transmission side and a winding resistance on the power reception side, respectively. Cp is capacitance of a capacitor connected in parallel with the reception coil in the resonance circuit on the power reception side. Lop is inductance of a coil connected in series with the reception coil. Rac is an AC equivalent resistance of a load circuit Ro and is expressed as Rac=(8/$\pi^2$)×Ro.

From the equivalent circuit 100, an F-matrix Fspl(s, k, Rac) of the non-contact power supply device according to the SPL method is expressed by the following equation (for clarity, equation (1) is also reproduced on a separate page at the end of the specification).

$$Fspl(s, k, Rac) = \begin{bmatrix} 1 & Ri \\ 0 & 1 \end{bmatrix} * \begin{bmatrix} 1 & \frac{1}{s*Crt} \\ 0 & 1 \end{bmatrix} * \begin{bmatrix} 1 & s*Lr(k) \\ 0 & 1 \end{bmatrix} * \\ \begin{bmatrix} 1 & 0 \\ \frac{1}{s*Lm(k)} & 1 \end{bmatrix} * \begin{bmatrix} 1 & s*Lr(k) \\ 0 & 1 \end{bmatrix} * \begin{bmatrix} 1 & n^2*Ris \\ 0 & 1 \end{bmatrix} * \\ \begin{bmatrix} 1 & 0 \\ \frac{s*Cp}{n^2} & 1 \end{bmatrix} * \begin{bmatrix} 1 & s*Lop*n^2 \\ 0 & 1 \end{bmatrix} * \begin{bmatrix} 1 & 0 \\ \frac{1}{n^2*Rac} & 1 \end{bmatrix} \quad (1)$$

In the above equation, s is expressed as s=j2πf. Note that f is the frequency of AC power that is supplied to the resonance circuit on the power transmission side. In addition, k denotes a coupling coefficient between the transmission coil and the reception coil.

From the definition of the F-matrix, output gain Gspl(s, k, Rac) of the non-contact power supply device according to the SPL method is expressed by the following equation.

$$Gspl(s, k, Rac) = \frac{1}{Fspl(s, k, Rac)_{0,0}} \cdot \frac{Vin}{2} \cdot \frac{1}{n} \quad (2)$$

In the above equation, Vin is the voltage of the AC power supplied to the resonance circuit on the power transmission side, and $Fspl(s, k, Rac)_{0,0}$ represents the upper left element of the F-matrix expressed by the equation (1).

Figure 2:
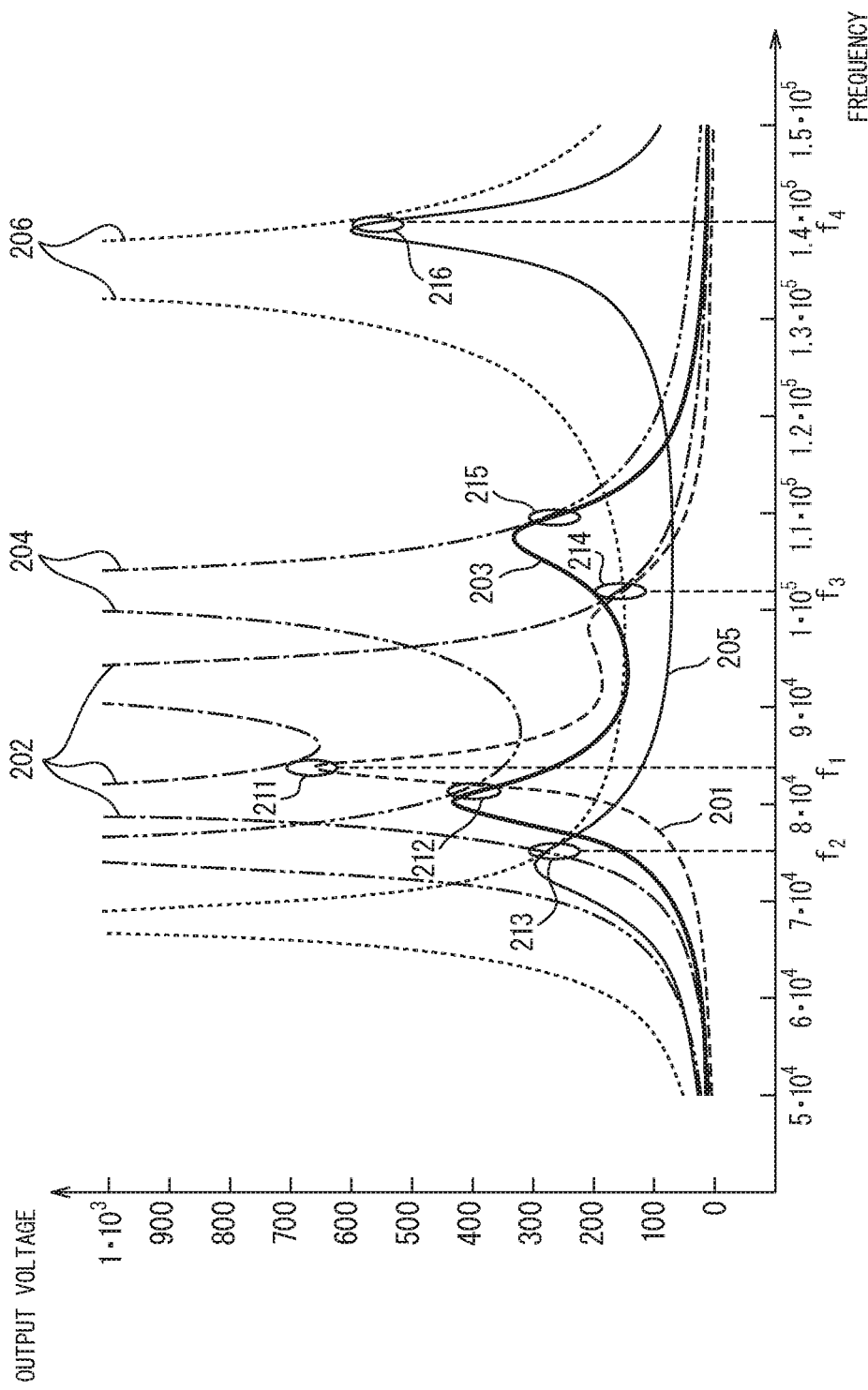
FIG. 2 is a diagram illustrating an example of simulation results of frequency responses of output voltage from the non-contact power supply device according to the SPL method.

FIG. 2 is a diagram illustrating an example of simulation results of frequency responses of output voltage from the non-contact power supply device according to the SPL method, which are calculated in accordance with the equation (2). In FIG. 2, frequency is plotted along the horizontal axis and output voltage is plotted along the vertical axis. Graph 201 represents a frequency response of the output voltage when the coupling coefficient k is set as k=0.15 and the AC equivalent resistance of the load circuit is set at Rac. In addition, graph 202 represents a frequency response of the output voltage when the coupling coefficient k is set as k=0.15 and the AC equivalent resistance of the load circuit is set at (10*Rac). Also, graph 203 represents a frequency response of the output voltage when the coupling coefficient k is set as k=0.3 and the AC equivalent resistance of the load circuit is set at Rac. In addition, graph 204 represents a frequency response of the output voltage when the coupling coefficient k is set as k=0.3 and the AC equivalent resistance of the load circuit is set at (10*Rac). Further, graph 205 represents a frequency response of the output voltage when the coupling coefficient k is set as k=0.6 and the AC equivalent resistance of the load circuit is set at Rac. Moreover, graph 206 represents a frequency response of the output voltage when the coupling coefficient k is set as k=0.6 and the AC equivalent resistance of the load circuit is set at (10*Rac). Note that, in the simulation, it is assumed that Lp=174 µH, Cr1=Cp=20 nF, Lop=3Lp, Ri=Ris=0.3Ω, n=1, Vin=200 V, and Ro=200Ω (Rac=162.1Ω).

As illustrated by points 211 to 216 in FIG. 2, there exist six combinations of a frequency and an output voltage at which the output voltage becomes substantially constant even when the AC equivalent resistance of the load circuit changes under the condition where the coupling coefficient k is constant (i.e., constant voltage output is obtained when the coupling coefficient k is constant). Among the points 211 to 216, the points 211 to 213 on the low frequency side are close to the resonance frequency of the resonance circuit on the power transmission side and are influenced by the resonance of the resonance circuit on the power transmission side. On the other hand, the points 214 to 216 on the high frequency side are a certain amount higher than the resonance frequency of the resonance circuit on the power transmission side and are little influenced by the resonance of the resonance circuit on the power transmission side. Since, in the SPL method, in general, the resonance circuit on the power transmission side is also resonated, AC power having frequencies as illustrated by the points 211 to 213 is necessarily supplied to the resonance circuit on the power transmission side in order to make the non-contact power supply device perform a constant voltage output operation.

Figure 3:
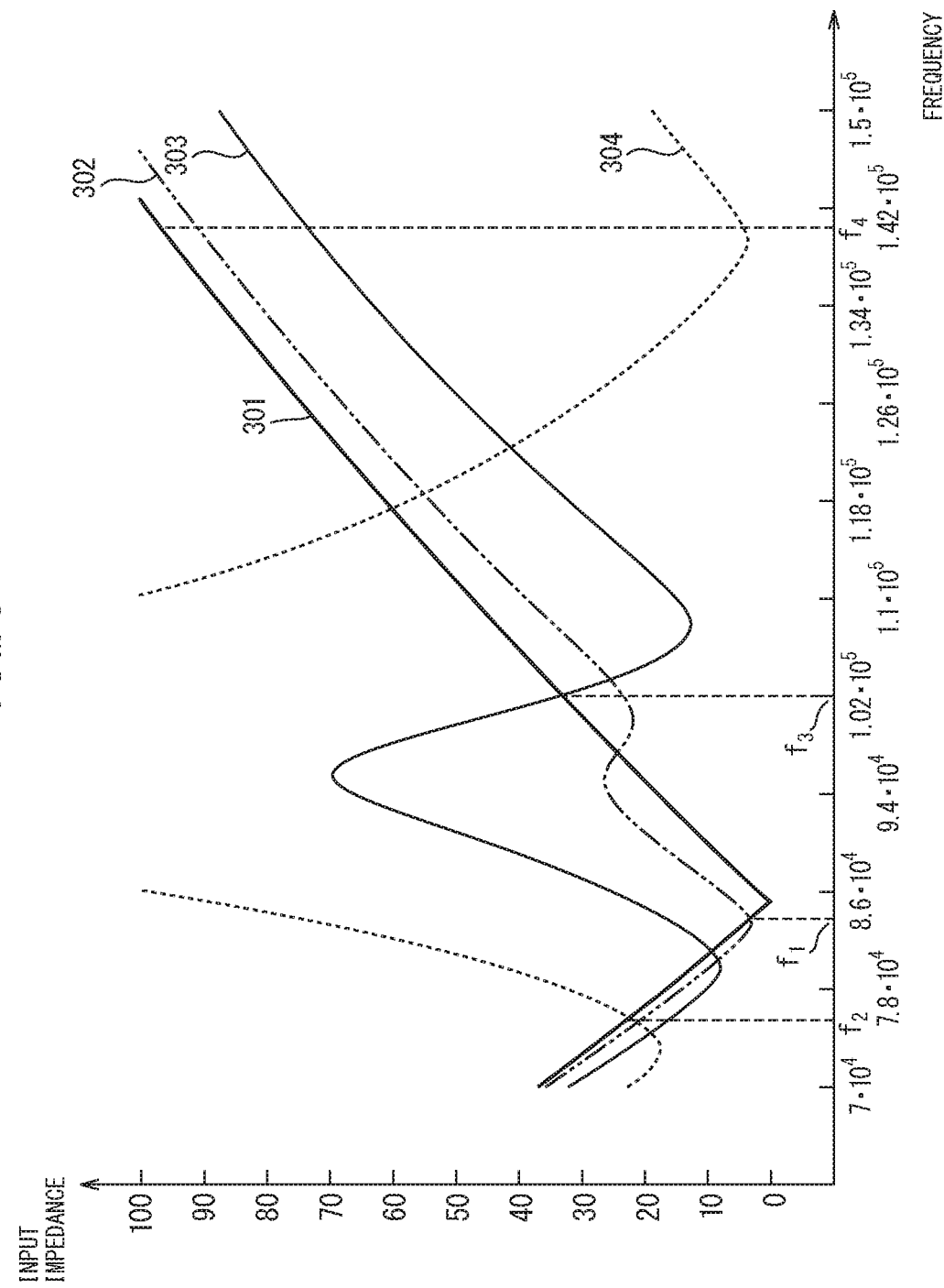
FIG. 3 is a diagram illustrating an example of simulation results of frequency responses of input impedance of the non-contact power supply device according to the SPL method.

FIG. 3 is a diagram illustrating an example of simulation results of frequency responses of input impedance Zinspl(s, k, Rac) of the non-contact power supply device according to the SPL method. In FIG. 3, frequency is plotted along the horizontal axis and input impedance is plotted along the vertical axis. Graphs 301 to 304 represent frequency responses of the input impedance Zinspl(s, k, Rac) when the AC equivalent resistance of the load circuit is set at Rac and the coupling coefficients k are set at 0.001, 0.15, 0.3, and 0.6, respectively. Note that the frequency responses of the input impedance Zinspl(s, k, Rac) illustrated by the graphs 301 to 304 were calculated by inputting values of the respective parameters used in the simulation illustrated in FIG. 2 into an equation of the input impedance Zinspl(s, k, Rac) that is expressed by the following equation.

$$Zinspl(s, k, Rac) = \frac{Fspl(s, k, Rac)_{0,0}}{Fspl(s, k, Rac)_{1,0}} \quad (3)$$

In the above equation, $Fspl(s, k, Rac)_{1,0}$ represents the lower left element of the F-matrix expressed by the equation (1).

As illustrated in FIG. 3, in a frequency range close to the resonance frequency of the resonance circuit on the power transmission side, as the coupling coefficient decreases, the input impedance becomes lower at frequencies at which a constant voltage is output. For example, at a frequency f1, illustrated by the point 211, at which the non-contact power supply device can perform constant voltage output operation when the coupling coefficient k=0.15, the input impedance at the coupling coefficient k=0.15 has a value smaller than 10Ω. This is because energy stored in the transmission coil increases as a result of an increase in current flowing through the resonance circuit on the power transmission side due to resonance of the resonance circuit. Thus, in the SPL method, supplying the resonance circuit on the power transmission side with AC power when the coupling coefficient is low causes energy loss to increase. In addition, as can be seen from the points 211 to 213, the output gain does not necessarily improve even when the coupling coefficient increases.

On the other hand, in a frequency range that is higher than the resonance frequency of the resonance circuit on the power transmission side and does not cause the resonance circuit on the power transmission side to resonate and in which the non-contact power supply device can perform constant voltage output operation even when the coupling coefficient changes (for example, a range from a frequency f3 corresponding to the point 214 in FIG. 2 to a frequency f4 corresponding to the point 216), the input impedance increases to a certain level and the energy loss is therefore suppressed. However, the frequency range becomes wider than a frequency range in which the resonance circuit on the power transmission side resonates and constant voltage output operation can be performed (a range from the frequency f2 to the frequency f1).

It is considered that this is because the resonance frequency of the resonance circuit on the power reception side varies, depending on the coupling coefficient.

Accordingly, the non-contact power supply device according to the embodiment of the present invention supplies power from a power transmission device configured to supply a transmission coil with AC power having a frequency at which the transmission coil does not resonate to a power reception device including a resonance circuit that causes parallel resonance and a coil connected in series with a reception coil included in the resonance circuit. In the resonance circuit of the power reception device, a coil that is not coupled with the transmission coil even at the time of power transmission is disposed separately from the reception coil. Because of this configuration, the non-contact power supply device can suppress an increase in energy loss due to variation in the coupling coefficient and narrow an adjustment range of frequency of AC power supplied to the transmission coil at the time of performing constant voltage output operation by suppressing variation in the resonance frequency of the resonance circuit of the power reception device due to change in the coupling coefficient between the transmission coil and the reception coil.

Further, the non-contact power supply device measures the output voltage from the resonance circuit on the power reception side and controls the switching frequency and voltage of the AC power supplied to the transmission coil in such a way that the measured value falls within an allowance range of voltage at the time of constant voltage output operation and thereby maintains the constant voltage output operation even when the coupling coefficient between the transmission coil and the reception coil or the resistance of the load circuit changes.

Note that, as used herein, the constant voltage output operation is an operation in which the non-contact power supply device operates in such a way that output voltage is maintained within an allowance range of voltage (for example, within ±10% of a predetermined voltage reference value) that is determined in accordance with the specification of a load circuit connected to the non-contact power supply device and the like.

Figure 4:
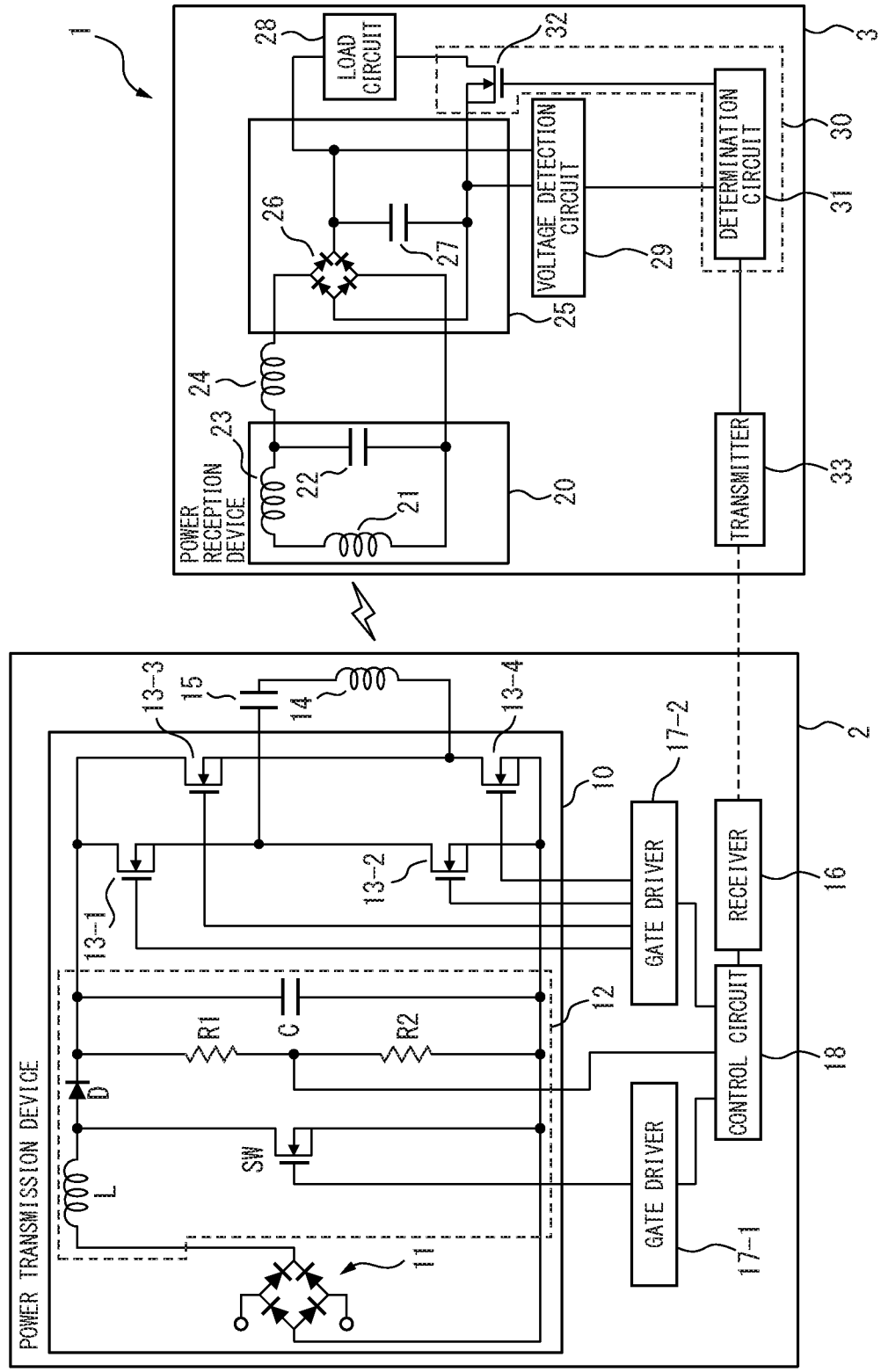
FIG. 4 is a schematic configuration view of a non-contact power supply device according to an embodiment of the present invention.

FIG. 4 is a schematic configuration view of a non-contact power supply device according to an embodiment of the present invention. As illustrated in FIG. 4, a non-contact power supply device 1 includes a power transmission device 2 and a power reception device 3 to which power is transmitted from the power transmission device 2 through space without contact. The power transmission device 2 includes a power supply circuit 10, a transmission coil 14, a capacitor 15, a receiver 16, gate drivers 17-1 and 17-2, and a control circuit 18. On the other hand, the power reception device 3 includes a resonance circuit 20 that includes a reception coil 21, a resonance capacitor 22, and a coil 23, a coil 24, a rectification and smoothing circuit 25, a load circuit 28, a voltage detection circuit 29, a constant voltage determination circuit 30, and a transmitter 33.

First, the power transmission device 2 will be described.

The power supply circuit 10 supplies the transmission coil 14 with AC power having adjustable switching frequency and adjustable voltage. To that end, the power supply circuit 10 includes a power source 11, a power factor improvement circuit 12, and four switching elements 13-1 to 13-4.

The power source 11 supplies power having a predetermined pulsating voltage. To that end, the power source 11 is connected to a commercial AC power source and includes a full-wave rectification circuit to rectify AC power supplied by the AC power source.

The power factor improvement circuit 12 converts the voltage of the power output from the power source 11 to a voltage that is determined in accordance with control from the control circuit 18 to output the converted voltage. To that end, the power factor improvement circuit 12 includes, for example, a coil L and a diode D that are connected in series in this order from the positive electrode terminal of the power source 11, a switching element SW whose drain terminal and source terminal are connected between the coil L and the diode D and connected to the negative electrode terminal of the power source 11, respectively, and that is an n-channel MOSFET, and a smoothing capacitor C that is connected in parallel with the switching element SW with the diode D interposed therebetween. In addition, the gate terminal of the switching element SW is connected to the gate driver 17-1. Further, the power factor improvement circuit 12 includes two resistors R1 and R2 that are connected in series between the positive electrode terminal and the negative electrode terminal of the power source 11. The resistors R1 and R2 are connected between the diode D and the smoothing capacitor C in parallel with the smoothing capacitor C. Voltage between the resistor R1 and the resistor R2 is measured by the control circuit 18 as a measurement representing voltage output from the diode D.

The power factor improvement circuit 12 performs a power factor improvement operation by the gate driver 17-1 controlling switching of the switching element SW between on and off states in accordance with a duty ratio designated by the control circuit 18 and in such a way that a trajectory of a current waveform output from the diode D coincides with a trajectory of voltage supplied from the power source 11. The higher the duty ratio at which the switching element SW is turned on, the higher the voltage output from the diode D becomes.

The voltage output from the diode D is smoothed by the smoothing capacitor C and supplied to the transmission coil 14 via the four switching elements 13-1 to 13-4.

Note that the power factor improvement circuit 12 is not limited to the above-described configuration and may have another configuration capable of adjusting output voltage, controlled by the control circuit 18.

For the four switching elements 13-1 to 13-4, for example, n-channel MOSFETs can be used. Among the four switching elements 13-1 to 13-4, the switching element 13-1 and the switching element 13-2 are connected in series between the positive electrode terminal and negative electrode terminal of the power source 11 via the power factor improvement circuit 12. In addition, in the present embodiment, the switching element 13-1 is connected to the positive electrode side of the power source 11, whereas the switching element 13-2 is connected to the negative electrode side of the power source 11. The drain terminal of the switching element 13-1 is connected to the positive electrode terminal of the power source 11 via the power factor improvement circuit 12, and the source terminal of the switching element 13-1 is connected to the drain terminal of the switching element 13-2. In addition, the source terminal of the switching element 13-2 is connected to the negative electrode terminal of the power source 11 via the power factor improvement circuit 12. Further, the source terminal of the switching element 13-1 and the drain terminal of the switching element 13-2 are connected to one end of the transmission coil 14 via the capacitor 15, and the source terminal of the switching element 13-2 is connected to the other end of the transmission coil 14 via the switching element 13-4.

Similarly, among the four switching elements 13-1 to 13-4, the switching element 13-3 and the switching element 13-4 are connected in parallel with the switching element 13-1 and the switching element 13-2 and in series between the positive electrode terminal and negative electrode terminal of the power source 11 via the power factor improvement circuit 12. In addition, the switching element 13-3 is connected to the positive electrode side of the power source 11, whereas the switching element 13-4 is connected to the negative electrode side of the power source 11. The drain terminal of the switching element 13-3 is connected to the positive electrode terminal of the power source 11 via the power factor improvement circuit 12, and the source terminal of the switching element 13-3 is connected to the drain terminal of the switching element 13-4. In addition, the source terminal of the switching element 13-4 is connected to the negative electrode terminal of the power source 11 via the power factor improvement circuit 12. Further, the source terminal of the switching element 13-3 and the drain terminal of the switching element 13-4 are connected to the other end of the transmission coil 14.

In addition, the gate terminals of the switching elements 13-1 to 13-4 are connected to the control circuit 18 via the gate driver 17-2. Further, each of the switching elements 13-1 to 13-4 may have its gate terminal connected to its own source terminal via a resistor to ensure that the switching element is turned on when a voltage to turn on the switching element is applied. The switching elements 13-1 to 13-4 are switched between on and off states at an adjustable switching frequency in accordance with a control signal from the control circuit 18. In the present embodiment, a pair of the switching element 13-1 and the switching element 13-4 and a pair of the switching element 13-2 and the switching element 13-3 are alternately switched between on and off states in such a way as to turn off the switching element 13-2 and the switching element 13-3 while the switching element 13-1 and the switching element 13-4 are turned on and, conversely, to turn off the switching element 13-1 and the switching element 13-4 while the switching element 13-2 and the switching element 13-3 are turned on. This configuration causes DC power supplied from the power source 11 via the power factor improvement circuit 12 to be converted into AC power having the switching frequency of the switching elements and supplied to the transmission coil 14.

The transmission coil 14 transmits the AC power supplied from the power supply circuit 10 to the resonance circuit 20 of the power reception device 3 through space.

The capacitor 15 is connected in series with the transmission coil 14 and cuts off DC current flowing to the transmission coil 14. Note that it is preferable that the capacitance of the capacitor 15 be set in such a way that the resonance frequency of the transmission coil 14 and the capacitor 15 is lower than the resonance frequency of the resonance circuit 20 of the power reception device 3 and the lower limit frequency of a frequency range in which the switching frequency is adjusted so that the transmission coil 14 and the capacitor 15 do not operate as a resonance circuit in the frequency range in which the switching frequency is adjusted.

The receiver 16 takes out, every time receiving a wireless signal from the transmitter 33 of the power reception device 3, determination information indicating whether or not the non-contact power supply device 1 performs constant voltage output operation and the like from the wireless signal and outputs the determination information to the control circuit 18. To that end, the receiver 16 includes, for example, an antenna for receiving a wireless signal and a communication circuit for demodulating the wireless signal in accordance with a predetermined wireless communication standard. Note that the predetermined wireless communication standard may be, for example, ISO/IEC 15693, ZigBee (registered trademark), or Bluetooth (registered trademark).

The gate driver 17-1 receives a control signal for switching the switching element SW of the power factor improvement circuit 12 between on and off states from the control circuit 18 and, in accordance with the control signal, changes voltage applied to the gate terminal of the switching elements SW. In other words, upon receiving a control signal to turn on the switching element SW, the gate driver 17-1 applies to the gate terminal of the switching element SW such a relatively high voltage as to turn on the switching element SW. On the other hand, upon receiving a control signal to turn off the switching element SW, the gate driver 17-1 applies to the gate terminal of the switching element SW such a relatively low voltage as to turn off the switching element SW. This configuration causes the gate driver 17-1 to switch the switching element SW of the power factor improvement circuit 12 between on and off states at timings designated by the control circuit 18.

The gate driver 17-2 receives a control signal for switching the switching elements 13-1 to 13-4 between on and off states from the control circuit 18 and, in accordance with the control signal, changes voltage applied to the gate terminals of the switching elements 13-1 to 13-4. In other words, upon receiving a control signal to turn on the switching element 13-1 and the switching element 13-4, the gate driver 17-2 applies to the gate terminal of the switching element 13-1 and the gate terminal of the switching element 13-4 such a relatively high voltage as to turn on the switching element 13-1 and the switching element 13-4. This operation causes current from the power source 11 to flow through the switching element 13-1, the transmission coil 14, and the switching element 13-4. On the other hand, upon receiving a control signal to turn off the switching element 13-1 and the switching element 13-4, the gate driver 17-2 applies to the gate terminal of the switching element 13-1 and the gate terminal of the switching element 13-4 such a relatively low voltage as to turn off the switching element 13-1 and the switching element 13-4 and as to prevent current from the power source 11 from flowing through the switching element 13-1 and the switching element 13-4. Similarly, the gate driver 17-2 controls voltage applied to the gate terminals of the switching element 13-2 and the switching element 13-3. Thus, when the switching element 13-1 and the switching element 13-4 are turned off and the switching element 13-2 and the switching element 13-3 are turned on, current from the power source 11 comes to flow through the switching element 13-3, the transmission coil 14, and the switching element 13-2.

The control circuit 18 includes, for example, a non-volatile memory circuit and a volatile memory circuit, an arithmetic operation circuit, and an interface circuit for connection to other circuits. Every time the control circuit 18 receives determination information from the receiver 16, the control circuit 18 controls the switching frequency and voltage of the AC power supplied from the power supply circuit 10 to the transmission coil 14 in accordance with the determination information.

To that end, in the present embodiment, the control circuit 18 controls the switching elements 13-1 to 13-4 in such a way that the pair of the switching element 13-1 and the switching element 13-4 and the pair of the switching element 13-2 and the switching element 13-3 are alternately turned on and that a duration for which the pair of the switching element 13-1 and the switching element 13-4 are in the on state and a duration for which the pair of the switching element 13-2 and the switching element 13-3 are in the on state are equal to each other in one period corresponding to the switching frequency. Note that, in order to prevent the pair of the switching element 13-1 and the switching element 13-4 and the pair of the switching element 13-2 and the switching element 13-3 from being simultaneously in the on state and the power source 11 from being short-circuited, the control circuit 18 may set a dead time during which both pairs of switching elements are turned off when the pair of the switching element 13-1 and the switching element 13-4 and the pair of the switching element 13-2 and the switching element 13-3 are switched between on and off states.

In addition, the control circuit 18, referring to a reference table each entry of which indicates a relationship between a switching frequency and a duty ratio that corresponds to an applied voltage to the transmission coil 14 that causes a constant voltage to be output at the switching frequency and is used in the on/off control of the switching element SW of the power factor improvement circuit 12, selects a duty ratio corresponding to a desired switching frequency. The control circuit 18 determines timings at which the switching element SW is switched between on and off states, on the basis of the duty ratio and change in the output voltage from the diode D of the power factor improvement circuit 12 and outputs control signals representing the timings to the gate driver 17-1.

Further, when the receiver 16 is unable to receive a wireless signal from the power reception device 3, it is judged that the power reception device 3 is not present at a position enabling the power reception device 3 to receive power supply from the power transmission device 2, i.e., the power transmission device 2 is in a standby state. Thus, in this case, the control circuit 18 may set the duty ratio for the on/off control of the switching element SW at a minimum value that can be set. Alternatively, the control circuit 18 may control the power supply circuit 10 in a so-called burst mode, which repeats control of making the power supply circuit 10 operate with the duty ratio for the on/off control of the switching element SW set at a preset value for a relatively short, fixed duration (for example, approximately several seconds) and subsequently suspending the power supply from the power supply circuit 10 to the transmission coil 14 with the switching elements kept in the off state for a relatively long duration (for example, approximately several minutes). Since this control causes the voltage applied to the transmission coil 14 to be set at a minimum value that can be set while the power transmission device 2 is in the standby state, energy loss can be suppressed.

Note that details of the control of the switching frequency and the applied voltage to the transmission coil 14 by the control circuit 18 will be described later.

Next, the power reception device 3 will be described.

The resonance circuit 20 is an LC resonance circuit in which the reception coil 21 and the coil 23 that are connected in series with each other and the resonance capacitor 22 are connected in parallel with each other. One end of the reception coil 21 included in the resonance circuit 20 is connected to one end of the resonance capacitor 22 via the coil 23 and, in conjunction therewith, connected to one input terminal of the rectification and smoothing circuit 25 via the coil 24. In addition, the other end of the reception coil 21 is connected to the other end of the resonance capacitor 22 and, in conjunction therewith, connected to the other input terminal of the rectification and smoothing circuit 25.

The reception coil 21 receives power from the transmission coil 14 by resonating with the AC current flowing through the transmission coil 14 of the power transmission device 2. The reception coil 21 outputs the received power to the rectification and smoothing circuit 25 via the coil 23, the resonance capacitor 22, and the coil 24. Note that the number of turns in the winding of the reception coil 21 and the number of turns in the winding of the transmission coil 14 of the power transmission device 2 may be identical or different.

The resonance capacitor 22 is, at one end, connected to one end of the reception coil 21 via the coil 23 and, in conjunction therewith, connected to the coil 24 and is connected at the other end to the other end of the reception coil 21 and the rectification and smoothing circuit 25. The resonance capacitor 22 outputs the power received by the reception coil 21 to the rectification and smoothing circuit 25 via the coil 24.

The coil 23 is connected between one end of the reception coil 21 and one end of the resonance capacitor 22. The coil 23 constitutes an LC resonance circuit in conjunction with the reception coil 21 and the resonance capacitor 22. In addition, differing from the reception coil 21, the coil 23 is disposed in such a way as not to be coupled with the transmission coil 14 even while power transmission from the power transmission device 2 to the power reception device 3 is performed. For this reason, a resonance frequency $f_{r2}$ of the resonance circuit 20 is expressed by the following equation.

$$f_{r2} = \frac{1}{2\pi\sqrt{C_p \cdot (L_{r2} + L_3)}} \quad (4)$$

$$L_{r2} = L_2(1-k)(1+k)$$

In the above equation, Cp is capacitance of the resonance capacitor 22, and $L_2$ is inductance of the reception coil 21. $L_{r2}$ is inductance of the reception coil 21 when the transmission coil 14 is short-circuited, and k denotes a coupling coefficient between the transmission coil 14 and the reception coil 21. In addition, $L_3$ is inductance of the coil 23. As is evident from the equation (4), it is revealed that, compared with a case where the coil 23 is not included (i.e., $L_3=0$), variation in the resonance frequency $f_{r2}$ of the resonance circuit 20 when the coupling coefficient k varies is suppressed. Since change in the resonance frequency is smaller as the inductance $L_3$ increases, an adjustment range of the switching frequency also becomes narrower. On the other hand, as the inductance $L_3$ increases, the gain of output power decreases. Thus, the inductance $L_3$ of the coil 23 is set in accordance with an adjustment range that can be set with respect to the switching frequency of the AC power supplied to the transmission coil 14. For example, when the adjustment range is from approximately 80 kHz to approximately 90 kHz, it is preferable that the inductance $L_3$ of the coil 23 be set at a value greater than the inductance $L_{r2}$ of the reception coil 21 when the transmission coil 14 is short-circuited and less than three times the inductance $L_{r2}$. However, the inductance $L_3$ of the coil 23 is not limited to the example.

The coil 24 is connected between the resonance circuit 20 and the rectification and smoothing circuit 25. In the present embodiment, the coil 24 is connected at one end to the coil 23 and resonance capacitor 22 of the resonance circuit 20 in such a way as to be in series with the reception coil 21 and the coil 23 and at the other end to the rectification and smoothing circuit 25. The coil 24 outputs the power received from the resonance circuit 20 to the rectification and smoothing circuit 25. Note that, as with the SPL method, disposing the coil 24 enables harmonic components of the received power to be suppressed.

The rectification and smoothing circuit 25 is an example of a rectification circuit, includes a full-wave rectification circuit 26 that includes four diodes connected in a bridge circuit and a smoothing capacitor 27, and rectifies and smooths the power which is received via the resonance circuit 20 and the coil 24 to convert the power into DC power. The rectification and smoothing circuit 25 outputs the DC power to the load circuit 28.

The voltage detection circuit 29 detects output voltage between both terminals of the rectification and smoothing circuit 25 every predetermined period. Since the output voltage between both terminals of the rectification and smoothing circuit 25 corresponds one-to-one to the output voltage of the resonance circuit 20, a measured value of the output voltage between both terminals of the rectification and smoothing circuit 25 indirectly represents a measured value of the output voltage of the resonance circuit 20. For the voltage detection circuit 29, for example, any of various known voltage detection circuits that can detect DC voltage can be used. The voltage detection circuit 29 outputs a voltage detection signal representing a measured value of the output voltage to the constant voltage determination circuit 30.

The constant voltage determination circuit 30 determines, on the basis of the measured value of the output voltage received from the voltage detection circuit 29, whether or not the non-contact power supply device 1 is performing a constant voltage output operation and whether or not the measured value of the output voltage falls within an allowance range of voltage when the constant voltage output operation is performed. The constant voltage determination circuit 30 notifies the transmitter 33 of a result of the determination. To that end, the constant voltage determination circuit 30 includes, for example, a memory circuit configured to store an allowance range of voltage and a determination circuit 31 including an arithmetic operation circuit configured to compare a measured value of the output voltage with the allowance range of voltage.

Further, the constant voltage determination circuit 30 includes a switching element 32, such as a MOSFET, that is connected between the rectification and smoothing circuit 25 and the load circuit 28. The switching element 32, when turned off, prevents current from flowing from the rectification and smoothing circuit 25 to the load circuit 28 (i.e., Rac=cc), whereas the switching element 32, when turned on, allows current to flow from the rectification and smoothing circuit 25 to the load circuit 28. The determination circuit 31 of the constant voltage determination circuit 30 switches the switching element 32 between on and off states at a predetermined period while measured values of the output voltage are out of the allowance range of voltage. This operation causes the resistance of the whole circuit including the load circuit 28, which is connected to the rectification and smoothing circuit 25, to change at the predetermined period. Therefore, the determination circuit 31 is able to determine whether or not the non-contact power supply device 1 performs constant voltage output operation by determining whether or not the measured values of the output voltage become substantially constant while switching the switching element 32 between on and off states. Thus, while measured values of the output voltage are substantially constant even when the determination circuit 31 switches the switching element 32 between on and off states at a predetermined period, the determination circuit 31 notifies the transmitter 33 that the non-contact power supply device 1 performs constant voltage output operation.

In addition, when measured values of the output voltage indicate that the non-contact power supply device 1 performs constant voltage output operation for a certain duration longer than the predetermined period, the determination circuit 31 suspends the switching of the switching element 32 between on and off states and maintains the switching element 32 in the on state. The determination circuit 31 determines whether or not the measured value of the output voltage falls within the allowance range of voltage and notifies the transmitter 33 of a result of the determination.

When the measured values of the output voltage fall within the allowance range of voltage for a certain duration longer than the predetermined period, the determination circuit 31 notifies the transmitter 33 of a determination result indicating that the non-contact power supply device 1 performs constant voltage output operation and the measured values of the output voltage are within the allowance range of voltage.

Note that, according to a variation, the constant voltage determination circuit 30 may include a resistor that is connected to the rectification and smoothing circuit 25 in parallel with the load circuit 28. In this case, the switching element 32 may be disposed in such a way as to be in series with the resistor and in parallel with the load circuit 28. In this case, the determination circuit 31 turns off the switching element 32 while measured values of the output voltage fall within the allowance range of voltage. On the other hand, when a measured value of the output voltage is out of the allowance range of voltage, the determination circuit 31 may, as with the above-described embodiment, switch the switching element 32 between on and off states at the predetermined period. According to the variation, the power supply to the load circuit 28 is maintained even when the non-contact power supply device 1 is not performing a constant voltage output operation.

Further, according to another variation, a second switching element, such as a MOSFET, may be disposed in parallel with the above-described resistor and in series with the load circuit 28. In this case, while measured values of the output voltage fall within the allowance range of voltage, the determination circuit 31 turns on the second switching element and thereby enables power supply to the load circuit 28. On the other hand, when a measured value of the output voltage is out of the allowance range of voltage, the determination circuit 31 may turn off the second switching element and suspend the power supply to the load circuit 28. Even when voltage of received power has increased to an excessively high level while the switching frequency is adjusted in the power transmission device 2, this configuration prevents the excessively high voltage from being applied to the load circuit 28.

The transmitter 33 generates, every predetermined transmission period, a wireless signal including determination information indicating whether or not the non-contact power supply device 1 is performing a constant voltage output operation and whether or not measured values of the output voltage fall within the allowance range of voltage, on the basis of a determination result received from the determination circuit 31 of the constant voltage determination circuit 30 and transmits the wireless signal to the receiver 16 of the power transmission device 2. To that end, the transmitter 33 includes, for example, a communication circuit that generates a wireless signal in accordance with a predetermined wireless communication standard and an antenna for outputting the wireless signal. Note that, as with the receiver 16, the predetermined wireless communication standard may be, for example, ISO/IEC 15693, ZigBee (registered trademark), or Bluetooth (registered trademark).

Operation of the non-contact power supply device 1 will be described in detail below.

In the present embodiment, the control circuit 18 of the power transmission device 2 controls the switching frequency and voltage of AC power supplied from the power supply circuit 10 to the transmission coil 14, on the basis of determination information received from the receiver 16, in such a way that the non-contact power supply device 1 continues a constant voltage output operation.

Figure 5:
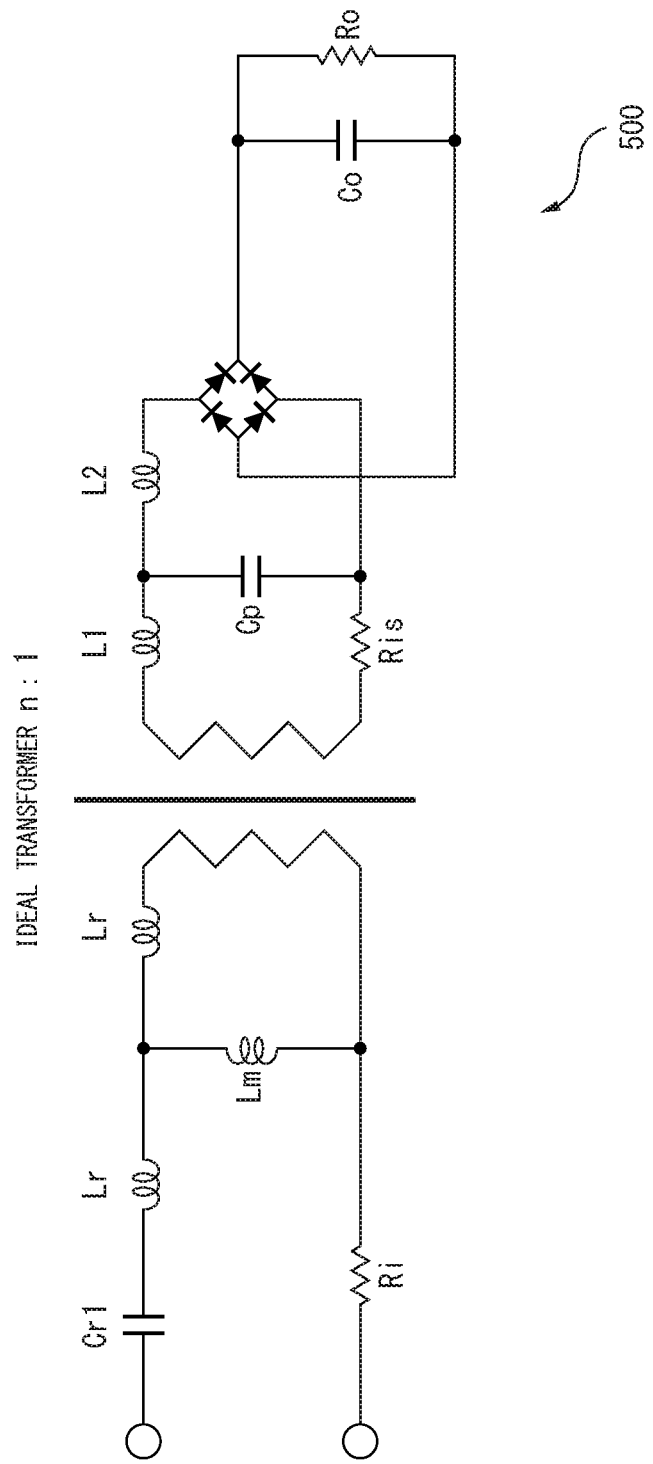
FIG. 5 is an equivalent circuit diagram of the non-contact power supply device according to the present embodiment.

FIG. 5 is an equivalent circuit diagram of the non-contact power supply device 1 according to the present embodiment. It is assumed that, in an equivalent circuit 500 in the diagram, the transmission coil 14 of the power transmission device 2 couples with the reception coil 21 of the resonance circuit 20 of the power reception device 3 to form an ideal transformer with a ratio of n:1. Cr1 is capacitance of the capacitor 15 connected in series with the transmission coil 14. Lr and Lm are leakage inductance and excitation inductance, respectively, by the transmission coil 14. Note that inductance Lp of the transmission coil 14 is equal to (Lm+Lr) and, when it is assumed that a coupling coefficient between the transmission coil 14 and the reception coil 21 is denoted by k, Lr=(1−k)Lp and Lm=kLp hold. In addition, Ri and Ris are a winding resistance on the power transmission side and a winding resistance on the power reception side, respectively. Cp is capacitance of the resonance capacitor 22 of the resonance circuit 20. L1 is inductance of the coil 23 connected in series with the reception coil 21, which are included in the resonance circuit 20. In addition, L2 is inductance of the coil 24 connected between the resonance circuit 20 and the rectification and smoothing circuit 25. Ro is resistance of the load circuit 28 (AC equivalent resistance $Rac=(8/\pi^2) \times Ro$).

From the equivalent circuit 500, an F-matrix Fp(s, k, Rac) of the non-contact power supply device 1 is expressed by the following equation (for clarity, equation (5) is also reproduced on a separate page at the end of the specification).

$$Fp(s, k, Rac) = \begin{bmatrix} 1 & Ri \\ 0 & 1 \end{bmatrix} * \begin{bmatrix} 1 & \frac{1}{s*Crt} \\ 0 & 1 \end{bmatrix} * \begin{bmatrix} 1 & s*Lr(k) \\ 0 & 1 \end{bmatrix} * \\ \begin{bmatrix} 1 & 0 \\ \frac{1}{s*Lm(k)} & 1 \end{bmatrix} * \begin{bmatrix} 1 & s*Lr(k) \\ 0 & 1 \end{bmatrix} * \begin{bmatrix} 1 & s*n^2*Lt \\ 0 & 1 \end{bmatrix} * \\ \begin{bmatrix} 1 & 0 \\ \frac{s*Cp}{n^2} & 1 \end{bmatrix} * \begin{bmatrix} 1 & s*L2*n^2 \\ 0 & 1 \end{bmatrix} * \begin{bmatrix} 1 & 0 \\ \frac{1}{n^2*Rac} & 1 \end{bmatrix} \quad (5)$$

Therefore, as with the equation (2), output gain Gp(s, k, Rac) of the non-contact power supply device 1 is expressed by the following equation.

$$Gp(s, k, Rac) = \frac{1}{Fp(s, k, Rac)_{0,0}} \cdot \frac{Vin}{2} \cdot \frac{1}{n} \quad (6)$$

In the above equation, Vin is voltage (amplitude) of the AC power supplied to the resonance circuit on the power transmission side, and $Fp(s, k, Rac)_{0,0}$ represents the upper left element of the F-matrix expressed by the equation (5).

Figure 6:
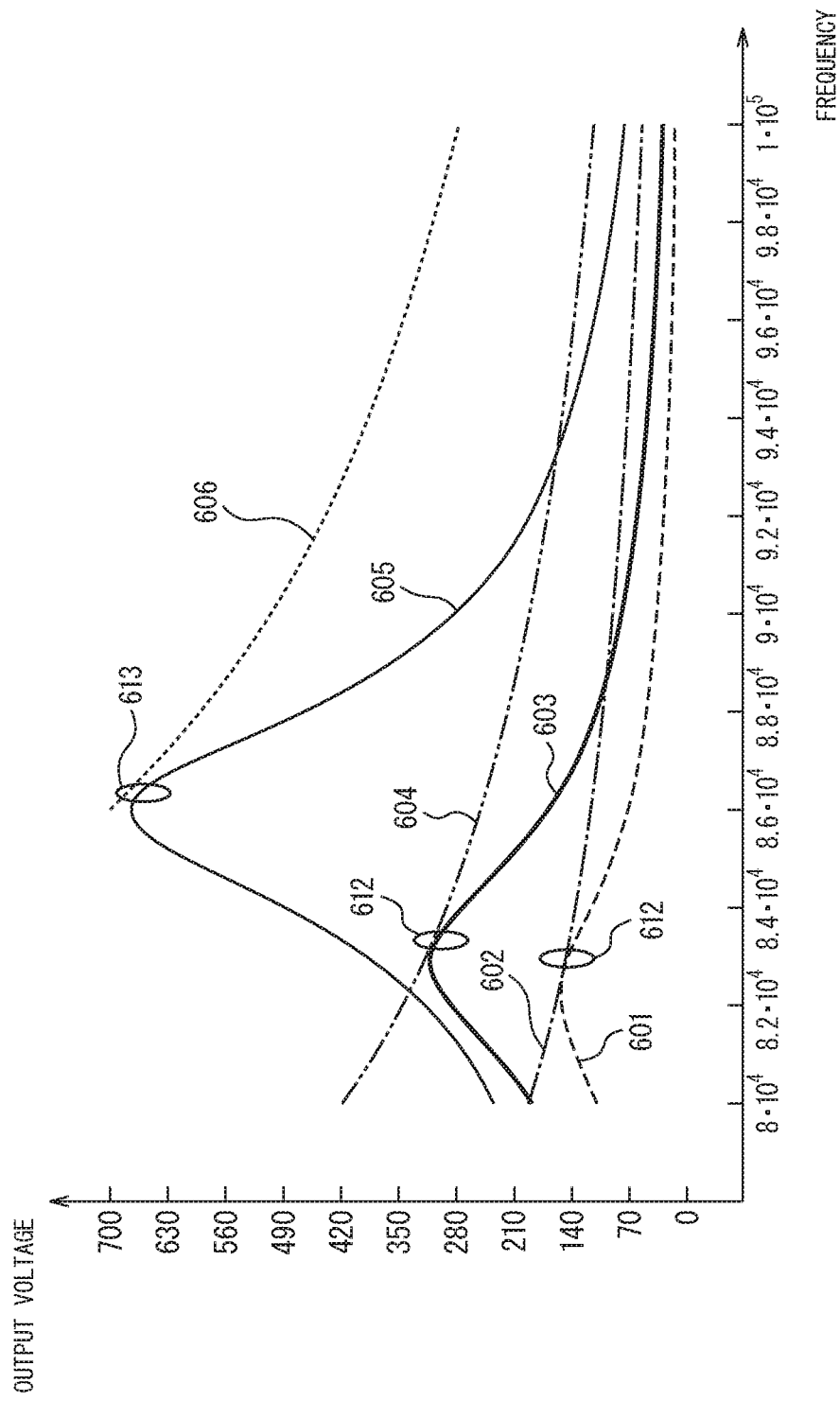
FIG. 6 is a diagram illustrating an example of simulation results of frequency responses of output voltage from the non-contact power supply device according to the present embodiment.

FIG. 6 is a diagram illustrating an example of simulation results of frequency responses of output voltage from the non-contact power supply device 1, which are calculated in accordance with the equation (6). In FIG. 6, frequency is plotted along the horizontal axis and output voltage is plotted along the vertical axis. Graph 601 represents a frequency response of the output voltage when the coupling coefficient k is set as k=0.15 and the AC equivalent resistance of the load circuit 28 is set at Rac. In addition, graph 602 represents a frequency response of the output voltage when the coupling coefficient k is set as k=0.15 and the AC equivalent resistance of the load circuit 28 is set at (10*Rac). In addition, graph 603 represents a frequency response of the output voltage when the coupling coefficient k is set as k=0.3 and the AC equivalent resistance of the load circuit 28 is set at Rac. In addition, graph 604 represents a frequency response of the output voltage when the coupling coefficient k is set as k=0.3 and the AC equivalent resistance of the load circuit 28 is set at (10*Rac). Further, graph 605 represents a frequency response of the output voltage when the coupling coefficient k is set as k=0.6 and the AC equivalent resistance of the load circuit 28 is set at Rac. In addition, graph 606 represents a frequency response of the output voltage when the coupling coefficient k is set as k=0.6 and the AC equivalent resistance of the load circuit 28 is set at (10*Rac). Note that, in the simulation, it is assumed that Lp=174 μH, Cr1=2 μF, Cp=10 nF, L1=350 μH, L2=1300 μH, Ri=Ris=0.3Ω, n=1, Ro=150Ω, and Vin=800 V.

In FIG. 6, since the transmission coil 14 does not resonate, extreme values of the output voltage disappear on the low frequency side compared with FIG. 2, in the frequency range illustrated in FIG. 6. However, even in this case, there exists, for every coupling coefficient, a combination of a frequency and an output voltage at which the output voltage becomes substantially constant (i.e., a constant voltage is output) even when the AC equivalent resistance of the load circuit changes under the condition where the coupling coefficient k does not change (there exist three combinations illustrated by points 611 to 613 in FIG. 6). Therefore, it is clear that, even when AC power having a switching frequency at which the transmission coil 14 does not resonate is applied to the transmission coil 14, it is possible to make the non-contact power supply device 1 perform a constant voltage output operation in the face of change in the resistance of the load circuit 28.

Further, although, as illustrated by the points 611 to 613, output voltages when a constant voltage is output against variation in the resistance of the load circuit 28 differ from one another, depending on the coupling coefficient, the differences in the output voltages can be reduced to a substantially constant output voltage without depending on the coupling coefficient by adjusting voltage applied to the transmission coil 14.

Figure 7:
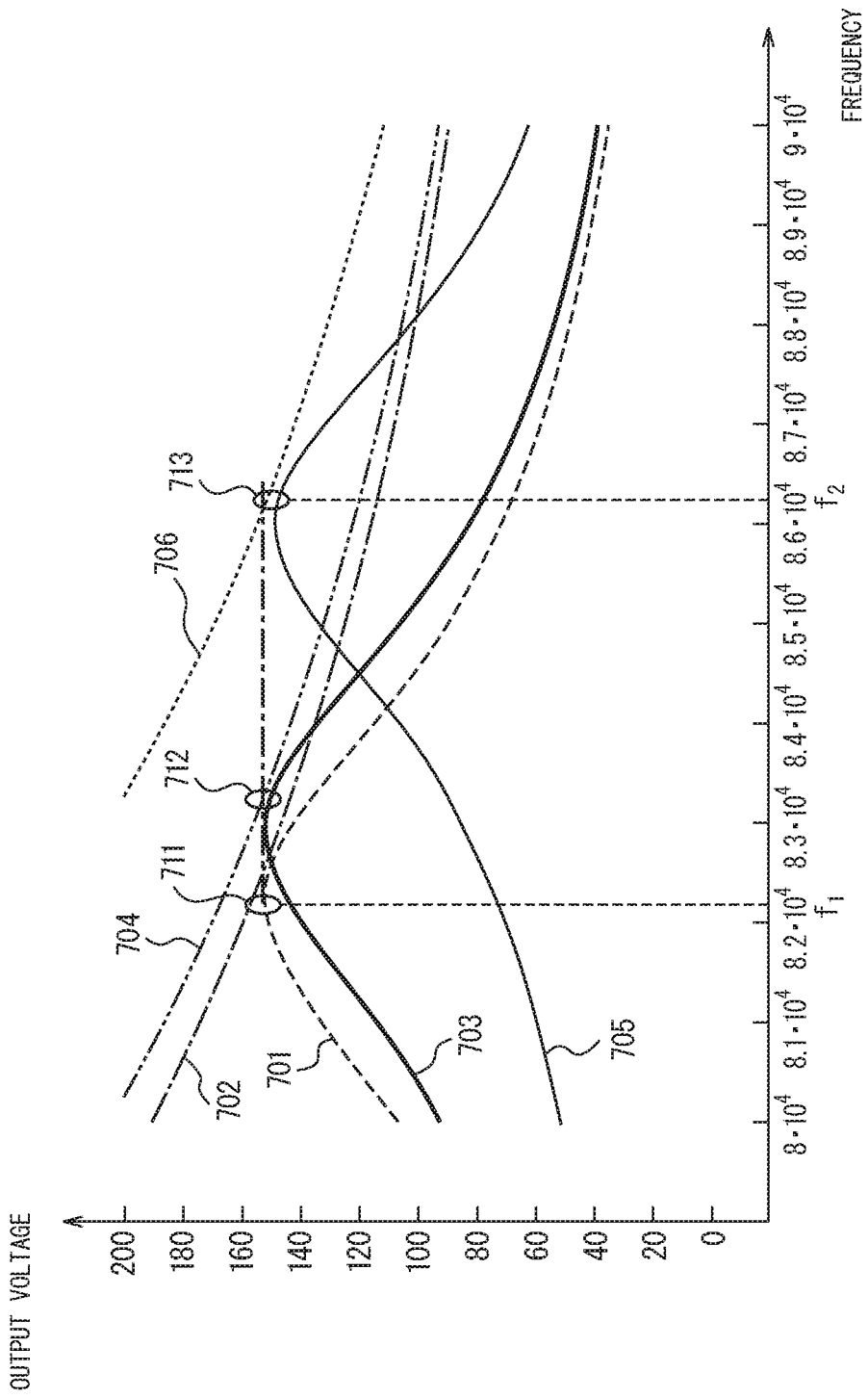
FIG. 7 is a diagram illustrating an example of simulation results of frequency responses of the output voltage when voltage applied to the transmission coil is changed in accordance with a coupling coefficient in the simulation illustrated in FIG. 6.

FIG. 7 is a diagram illustrating an example of simulation results of frequency responses of the output voltage when the voltage applied to the transmission coil 14 is changed in accordance with the coupling coefficient in the simulation illustrated in FIG. 6. In FIG. 7, frequency is plotted along the horizontal axis and output voltage is plotted along the vertical axis. Graph 701 represents a frequency response of the output voltage when the coupling coefficient k is set as k=0.15, the AC equivalent resistance of the load circuit 28 is set at Rac, and the voltage applied to the transmission coil 14 is set at Vin. In addition, graph 702 represents a frequency response of the output voltage when the coupling coefficient k is set as k=0.15, the AC equivalent resistance of the load circuit 28 is set at (10*Rac), and the voltage applied to the transmission coil 14 is set at Vin. In addition, graph 703 represents a frequency response of the output voltage when the coupling coefficient k is set as k=0.3, the AC equivalent resistance of the load circuit 28 is set at Rac, and the voltage applied to the transmission coil 14 is set at (0.49*Vin). In addition, graph 704 represents a frequency response of the output voltage when the coupling coefficient k is set as k=0.3, the AC equivalent resistance of the load circuit 28 is set at (10*Rac), and the voltage applied to the transmission coil 14 is set at (0.49*Vin). Further, graph 705 represents a frequency response of the output voltage when the coupling coefficient k is set as k=0.6, the AC equivalent resistance of the load circuit 28 is set at Rac, and the voltage applied to the transmission coil 14 is set at (0.22*Vin). In addition, graph 706 represents a frequency response of the output voltage when the coupling coefficient k is set as k=0.6, the AC equivalent resistance of the load circuit 28 is set at (10*Rac), and the voltage applied to the transmission coil 14 is set at (0.22*Vin).

Combinations of a frequency and an output voltage that correspond to the points 611 to 613 illustrated in FIG. 6 and at which the output voltage becomes substantially constant (i.e., a constant voltage is output) even when the AC equivalent resistance of the load circuit 28 changes under the condition where the coupling coefficient k does not change are three combinations indicated by points 711 to 713. The output voltages at the respective points 711 to 713 are substantially equal to one another.

From the above description, it is clear that even when either the resistance of the load circuit 28 or the coupling coefficient changes, appropriately adjusting the switching frequency and voltage of the AC power applied to the transmission coil 14 enables the output voltage to be maintained substantially constant.

Further, a frequency range from frequency f1 corresponding to the point 711 to frequency f2 corresponding to the point 713 is considerably narrower than the frequency range from the frequency f3 corresponding to the point 214 to the frequency f4 corresponding to the point 216, which are illustrated in FIG. 2. Thus, it is clear that the adjustment range of frequency when making the non-contact power supply device 1 perform constant voltage output operation can be made narrower than the adjustment range of frequency when making the non-contact power supply device according to the SPL method perform constant voltage output operation at a frequency at which the resonance circuit on the power transmission side does not resonate.

Consequently, in order to achieve constant voltage output operation, the control circuit 18 controls the switching frequency and voltage of the AC power applied to the transmission coil 14, as described below.

When determination information included in a wireless signal received from the power reception device 3 via the receiver 16 indicates that the non-contact power supply device 1 is not performing a constant voltage output operation, the control circuit 18 changes the switching frequency of the AC power within a predetermined frequency range. The predetermined frequency range can be set as, for example, a frequency range whose lower limit and upper limit are set to a frequency at which a constant voltage is output at the minimum of the expected values of the coupling coefficient between the transmission coil 14 and the reception coil 21 and a frequency at which a constant voltage is output at the maximum of the expected values of the coupling coefficient between the transmission coil 14 and the reception coil 21, respectively, when power is supplied from the power transmission device 2 to the power reception device 3.

When changing the switching frequency, the control circuit 18 may successively raise the switching frequency from the lower limit to the upper limit of the predetermined frequency range or, conversely, successively lower the switching frequency from the upper limit to the lower limit of the predetermined frequency range. In addition, it is preferable that, in order for the constant voltage determination circuit 30 of the power reception device 3 to be able to check whether or not the output voltage has become substantially constant, the control circuit 18 change the switching frequency in a stepwise manner in such a way as to keep the same switching frequency for a duration longer than the period at which the determination circuit 31 of the constant voltage determination circuit 30 switches the switching element 32 between on and off states.

Note that it is preferable that, while adjusting the switching frequency, the control circuit 18 reduce the voltage applied to the transmission coil 14 to a lower limit voltage. This configuration prevents the voltage of power supplied to the power reception device 3 from excessively increasing.

When, the determination information included in the wireless signal received from the power reception device 3 via the receiver 16, indicates that measured values of the output voltage, although not falling within the allowance range of voltage, are substantially constant even when the resistance of the load circuit 28 changes, i.e., constant voltage output operation is performed, the control circuit 18 keeps the switching frequency constant thereafter. Next, the control circuit 18 determines a duty ratio, referring to the reference table each entry of which indicates a relationship between a switching frequency and a duty ratio that causes a constant voltage to be output at the switching frequency without depending on the coupling coefficient and is used in the on/off control of the switching element SW of the power factor improvement circuit 12. The control circuit 18 controls the gate driver 17-1 in such a way as to switch the switching element SW of the power factor improvement circuit 12 between on and off states in accordance with the duty ratio. This operation causes the voltage applied to the transmission coil 14 to be adjusted in such a way that the output voltage from the resonance circuit 20 falls within the allowance range of voltage, i.e., a constant voltage is output without depending on the coupling coefficient. When the determination information included in a wireless signal received from the power reception device 3 via the receiver 16 indicates that measured values of the output voltage fall within the allowance range of voltage, the control circuit 18 keeps constant the switching frequency and voltage of the AC power supplied to the transmission coil 14.

Note that the control circuit 18 may change, in place of determining a duty ratio referring to the above-described reference table, the duty ratio gradually until the determination information included in a wireless signal received from the power reception device 3 via the receiver 16 indicates that measured values of the output voltage fall within the allowance range of voltage.

In addition, in order to improve the energy transmission efficiency, it is preferable that the power supply circuit 10 and transmission coil 14 of the power transmission device 2 continue to operate with soft switching (inductive operation). In order for the power supply circuit 10 and the transmission coil 14 to operate with soft switching, it is preferable that the phase of current flowing through the transmission coil 14 be delayed from the phase of voltage applied thereof. This configuration allows, for example, current to flow from the source terminal to the drain terminal of the switching element 13-1 when the switching element 13-1 and the switching element 13-4 are turned on, and the power supply circuit 10 and the transmission coil 14 thereby operate with soft switching, suppressing the occurrence of switching loss.

Figure 8:
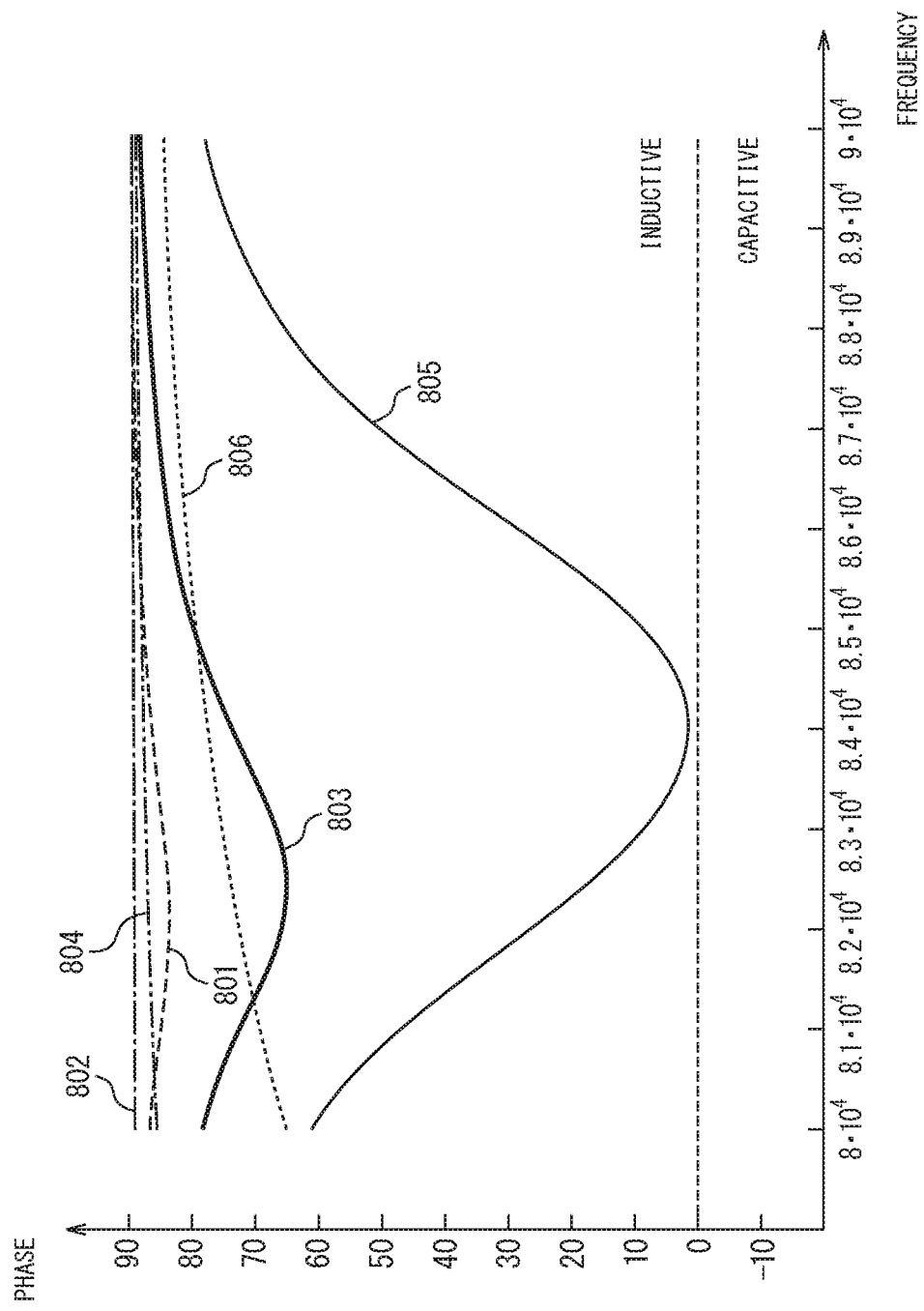
FIG. 8 is a diagram illustrating frequency responses of delay of phase of current with respect to phase of voltage regarding AC power applied to the transmission coil in the non-contact power supply device according to the present embodiment.

FIG. 8 is a diagram illustrating frequency responses of delay of the phase of current with respect to the phase of voltage regarding AC power applied to the transmission coil 14 in the non-contact power supply device 1 according to the present embodiment. In FIG. 8, frequency is plotted along the horizontal axis and phase is plotted along the vertical axis. Note that, in the diagram, a case where phase has a positive value indicates that the phase of current is delayed with respect to the phase of voltage. Graph 801 represents a frequency response of delay of phase when the coupling coefficient k is set as k=0.15 and the AC equivalent resistance of the load circuit 28 is set at Rac. In addition, graph 802 represents a frequency response of delay of phase when the coupling coefficient k is set as k=0.15 and the AC equivalent resistance of the load circuit 28 is set at (10*Rac). In addition, graph 803 represents a frequency response of delay of phase when the coupling coefficient k is set as k=0.3 and the AC equivalent resistance of the load circuit 28 is set at Rac. In addition, graph 804 represents a frequency response of delay of phase when the coupling coefficient k is set as k=0.3 and the AC equivalent resistance of the load circuit 28 is set at (10*Rac). Further, graph 805 represents a frequency response of delay of phase when the coupling coefficient k is set as k=0.6 and the AC equivalent resistance of the load circuit 28 is set at Rac. In addition, graph 806 represents a frequency response of delay of phase when the coupling coefficient k is set as k=0.6 and the AC equivalent resistance of the load circuit 28 is set at (10*Rac).

As illustrated by the graphs 801 to 806, it is revealed that, in a frequency range including frequencies corresponding to the points 711 to 713 illustrated in FIG. 7, i.e., in a frequency range that causes the non-contact power supply device 1 to perform constant voltage output operation, the delay of phase constantly has a positive value without depending on the coupling coefficient. Therefore, it is evident that the non-contact power supply device 1 according to the present embodiment is capable of making the power supply circuit 10 and the transmission coil 14 operate with soft switching.

As described in the foregoing, by disposing, in the resonance circuit of the power reception device, a coil that is connected in series with the reception coil and is not coupled with the transmission coil even at the time of power transmission, the non-contact power supply device suppresses change in the resonance frequency of the resonance circuit due to change in the coupling coefficient between the transmission coil and the reception coil. This configuration enables the non-contact power supply device to narrow the adjustment range of switching frequency of AC power supplied to the transmission coil when performing constant voltage output operation in an environment in which the coupling coefficient does not stay constant. In addition, the non-contact power supply device suppresses an increase in current flowing through the transmission coil by supplying the transmission coil of the power transmission device with AC power having a switching frequency at which the transmission coil does not resonate and thereby causing input impedance to have a certain magnitude even when the coupling coefficient decreases. Thus, the non-contact power supply device is capable of suppressing energy loss even when the coupling coefficient between the transmission coil and the reception coil is low. In addition, the non-contact power supply device monitors output voltage from the resonance circuit of the power reception device and controls the switching frequency and voltage of the AC power supplied to the transmission coil in accordance with the output voltage. This configuration enables the non-contact power supply device to perform a constant voltage output operation even when the coupling coefficient between the transmission coil and the reception coil changes or the resistance of the load circuit changes.

According to a variation, in a resonance circuit 20 of a power reception device 3, a coil 23 that does not resonate with a transmission coil 14 even at the time of power transmission may be connected in series with a resonance capacitor 22 and in parallel with a reception coil 21.

Figure 9:
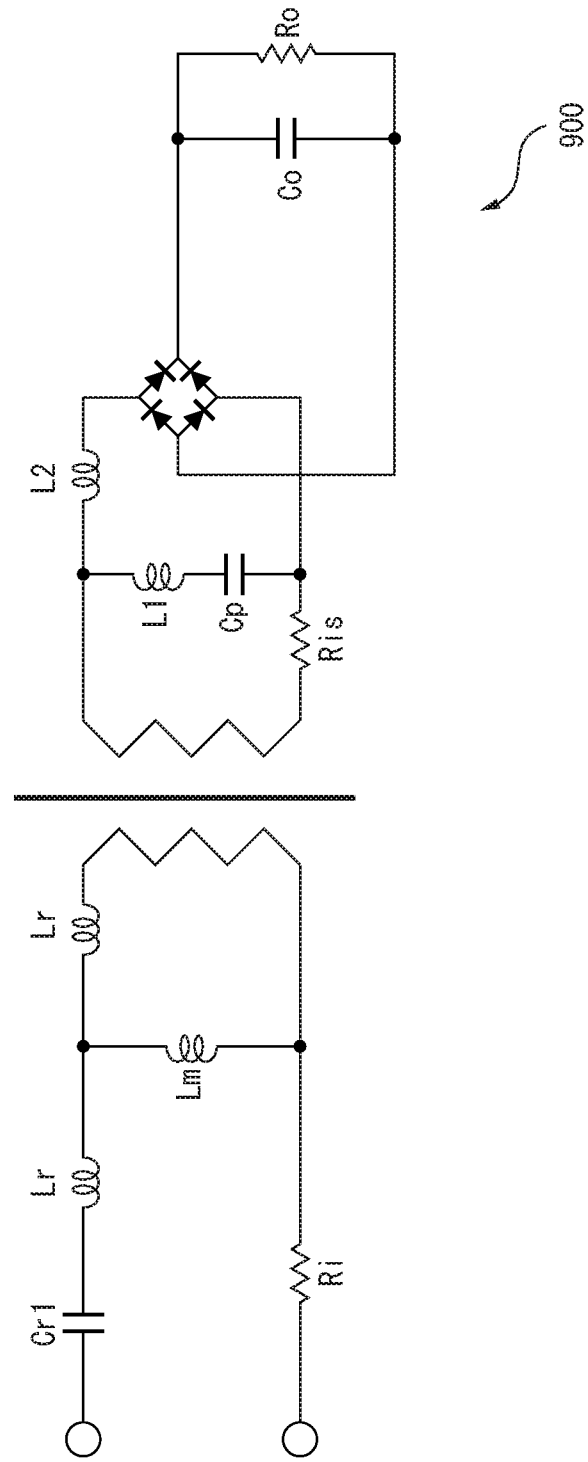
FIG. 9 is an equivalent circuit diagram of a non-contact power supply device according to a variation.

FIG. 9 is an equivalent circuit diagram of a non-contact power supply device according to the variation. An equivalent circuit 900 illustrated in FIG. 9 differs from the equivalent circuit 500 illustrated in FIG. 5 in that the coil 23 (corresponding to inductance L1) is connected in series with the resonance capacitor 22 (corresponding to capacitance Cp) and the coil 23 and the resonance capacitor 22 are in parallel with an ideal transformer that is constituted by the transmission coil 14 coupled with the reception coil 21. An F-matrix Fp2(s, k, Rac) of the non-contact power supply device according to the variation is expressed by the following equation (for clarity, equation (7) is also reproduced on a separate page at the end of the specification).

$$Fp2(s, k, Rac) = \begin{bmatrix} 1 & Ri \\ 0 & 1 \end{bmatrix} * \begin{bmatrix} 1 & \frac{1}{s*Crt} \\ 0 & 1 \end{bmatrix} * \begin{bmatrix} 1 & s*Lr(k) \\ 0 & 1 \end{bmatrix} *$$
$$\begin{bmatrix} 1 & 0 \\ \frac{1}{s*Lm(k)} & 1 \end{bmatrix} * \begin{bmatrix} 1 & s*Lr(k) \\ 0 & 1 \end{bmatrix} * \begin{bmatrix} 1 & n^2*Ris \\ 0 & 1 \end{bmatrix} *$$
$$\begin{bmatrix} 1 & 0 \\ \frac{s*Cp}{n^2} + s*n^2*Lt & 1 \end{bmatrix} * \begin{bmatrix} 1 & s*L2*n^2 \\ 0 & 1 \end{bmatrix} * \begin{bmatrix} 1 & 0 \\ \frac{1}{n^2*Rac} & 1 \end{bmatrix} \quad (7)$$

Therefore, as with the equation (2), output gain Gp2(s, k, Rac) of the non-contact power supply device 1 is expressed by the following equation.

$$Gp2(s, k, Rac) = \frac{1}{Fp2(s, k, Rac)_{0,0}} \cdot \frac{Vin}{2} \cdot \frac{1}{n} \quad (8)$$

In the above equation, Vin is voltage (amplitude) of AC power supplied to the resonance circuit on the power transmission side, and $Fp2(s, k, Rac)_{0,0}$ represents the upper left element of the F-matrix expressed by the equation (7).

Figure 10:
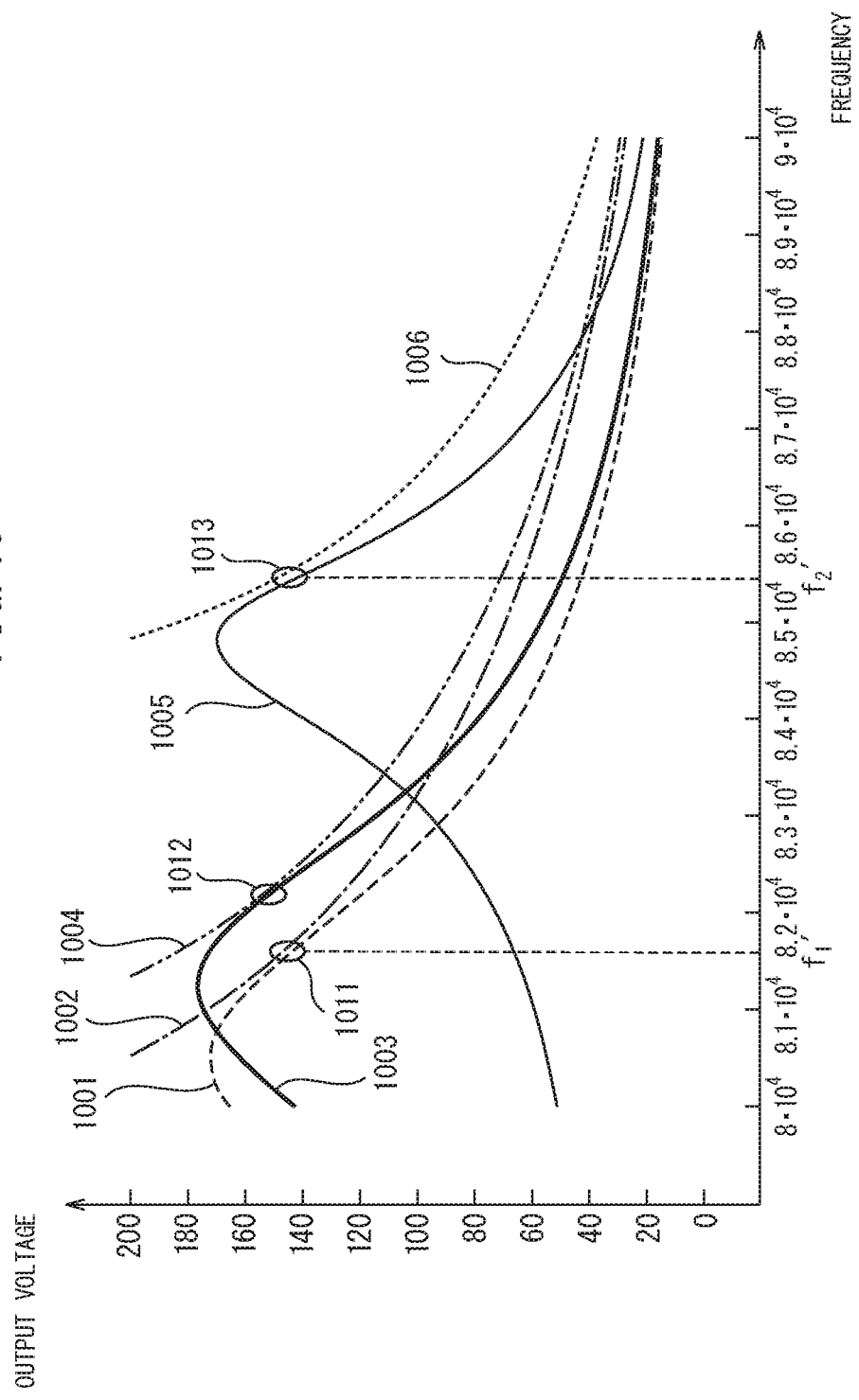
FIG. 10 is a diagram illustrating an example of simulation results of frequency responses of output voltage from the non-contact power supply device according to the variation when voltage applied to the transmission coil is changed in accordance with the coupling coefficient.

FIG. 10 is a diagram illustrating an example of simulation results of frequency responses of output voltage from the non-contact power supply device according to the variation when voltage applied to the transmission coil 14 is changed in accordance with the coupling coefficient, the frequency responses being calculated in accordance with the equation (8). In FIG. 10, frequency is plotted along the horizontal axis and output voltage is plotted along the vertical axis. Graph 1001 represents a frequency response of the output voltage when the coupling coefficient k is set as k=0.15, the AC equivalent resistance of a load circuit 28 is set at Rac, and the voltage applied to the transmission coil 14 is set at Vin. In addition, graph 1002 represents a frequency response of the output voltage when the coupling coefficient k is set as k=0.15, the AC equivalent resistance of the load circuit 28 is set at (10*Rac), and the voltage applied to the transmission coil 14 is set at Vin. In addition, graph 1003 represents a frequency response of the output voltage when the coupling coefficient k is set as k=0.3, the AC equivalent resistance of the load circuit 28 is set at Rac, and the voltage applied to the transmission coil 14 is set at (0.48*Vin). In addition, graph 1004 represents a frequency response of the output voltage when the coupling coefficient k is set as k=0.3, the AC equivalent resistance of the load circuit 28 is set at (10*Rac), and the voltage applied to the transmission coil 14 is set at (0.48*Vin). Further, graph 1005 represents a frequency response of the output voltage when the coupling coefficient k is set as k=0.6, the AC equivalent resistance of the load circuit 28 is set at Rac, and the voltage applied to the transmission coil 14 is set at (0.17*Vin). In addition, graph 1006 represents a frequency response of the output voltage when the coupling coefficient k is set as k=0.6, the AC equivalent resistance of the load circuit 28 is set at (10*Rac), and the voltage applied to the transmission coil 14 is set at (0.17*Vin). Note that, in the simulation, it is assumed that Lp=174 μH, Cr1=2 μF, Cp=10 nF, L1=260 μH, L2=430 μH, Ri=Ris=0.3Ω, n=1, Ro=150Ω, and Vin=800 V.

As illustrated in FIG. 10, in the variation, there also exists, for every coupling coefficient, a combination of a frequency and an output voltage at which the output voltage becomes substantially constant even when the AC equivalent resistance of the load circuit 28 changes under the condition where the coupling coefficient k does not change (there exist three combinations illustrated by points 1011 to 1013 in the Figure). In addition, a range from frequency f1' corresponding to the point 1011 to frequency f2' corresponding to the point 1013 in the variation is substantially equal to the range from the frequency f1 corresponding to the point 711 to the frequency f2 corresponding to the point 713 that are illustrated in FIG. 7. Therefore, the non-contact power supply device according to the variation is also capable of performing constant voltage output operation even when the coupling coefficient does not stay constant and narrowing an adjustment range of frequency of AC power supplied to the transmission coil 14. In addition, in the variation, as is evident from the parameter values of the respective circuit elements used in the simulation in FIG. 7 and the parameter values of the respective circuit elements used in the simulation in FIG. 10, inductance of the coil 23 and inductance of the coil 24 can be set lower than that of the coil 23 and the coil 24 in the above-described embodiment, respectively, in order to set the adjustment ranges of frequency approximately the same as each other.

In addition, according to another variation, in place of disposing a coil that is not coupled with a transmission coil 14 in a resonance circuit 20 of a power reception device 3, a coil that is connected in series with the transmission coil 14 and is not coupled with a reception coil 21 even at the time of power transmission may be disposed in a power transmission device 2.

Figure 11:
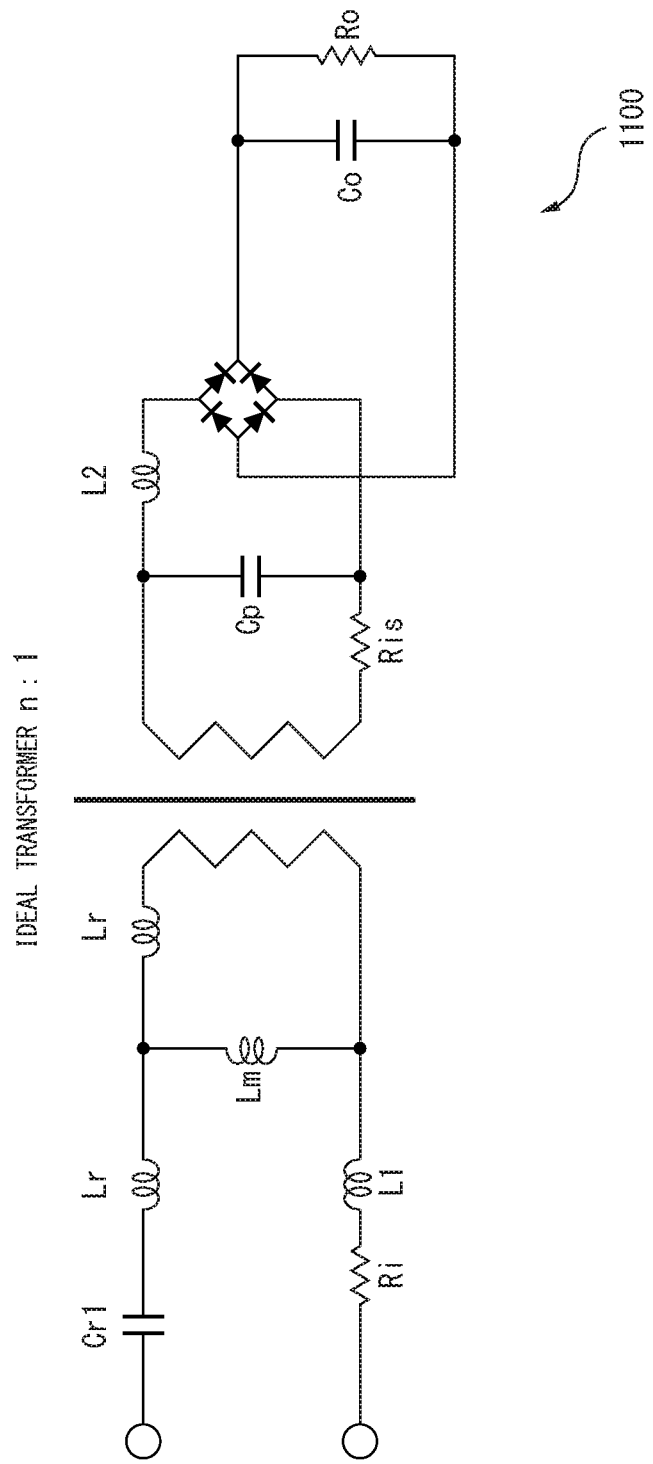
FIG. 11 is an equivalent circuit diagram of a non-contact power supply device according to another variation.

FIG. 11 is an equivalent circuit diagram of a non-contact power supply device according to the variation. An equivalent circuit 1100 illustrated in FIG. 11 differs from the equivalent circuit 500 illustrated in FIG. 5 in that a coil that corresponds to inductance L1 and is not coupled with the reception coil 21 even at the time of power transmission is disposed in such a manner as to be connected in series with the transmission coil 14.

In this case, a resonance frequency $f_{r2}$ of the resonance circuit 20 is expressed by the following equation.

$$f_{r2} = \frac{1}{2\pi\sqrt{C_p \cdot \left(L_{r2} \times \frac{L_3 + L_{r2}}{(1-k)^2 \times L_3 + L_{r2}}\right)}} \quad (9)$$

$$L_{r2} = L_2(1-k)(1+k)$$

In the above equation, Cp is capacitance of a resonance capacitor 22, and $L_2$ is inductance of the reception coil 21. $L_{r2}$ is inductance of the reception coil 21 when the transmission coil 14 is short-circuited, and k denotes a coupling coefficient between the transmission coil 14 and the reception coil 21. In addition, $L_3$ is inductance of the coil connected in series with the transmission coil 14. Since the coupling coefficient k is constantly 0 or more and 1 or less, the denominator on the right-hand side of the equation (9) is larger as the coupling coefficient k increases compared with a case where the coil connected in series with the transmission coil 14 is not included (i.e., $L_3$=0), and, as a result, increase in the resonance frequency $f_{r2}$ is suppressed. Therefore, it is clear that variation in the resonance frequency $f_{r2}$ of the resonance circuit 20 when the coupling coefficient k changes is suppressed.

Figure 12:
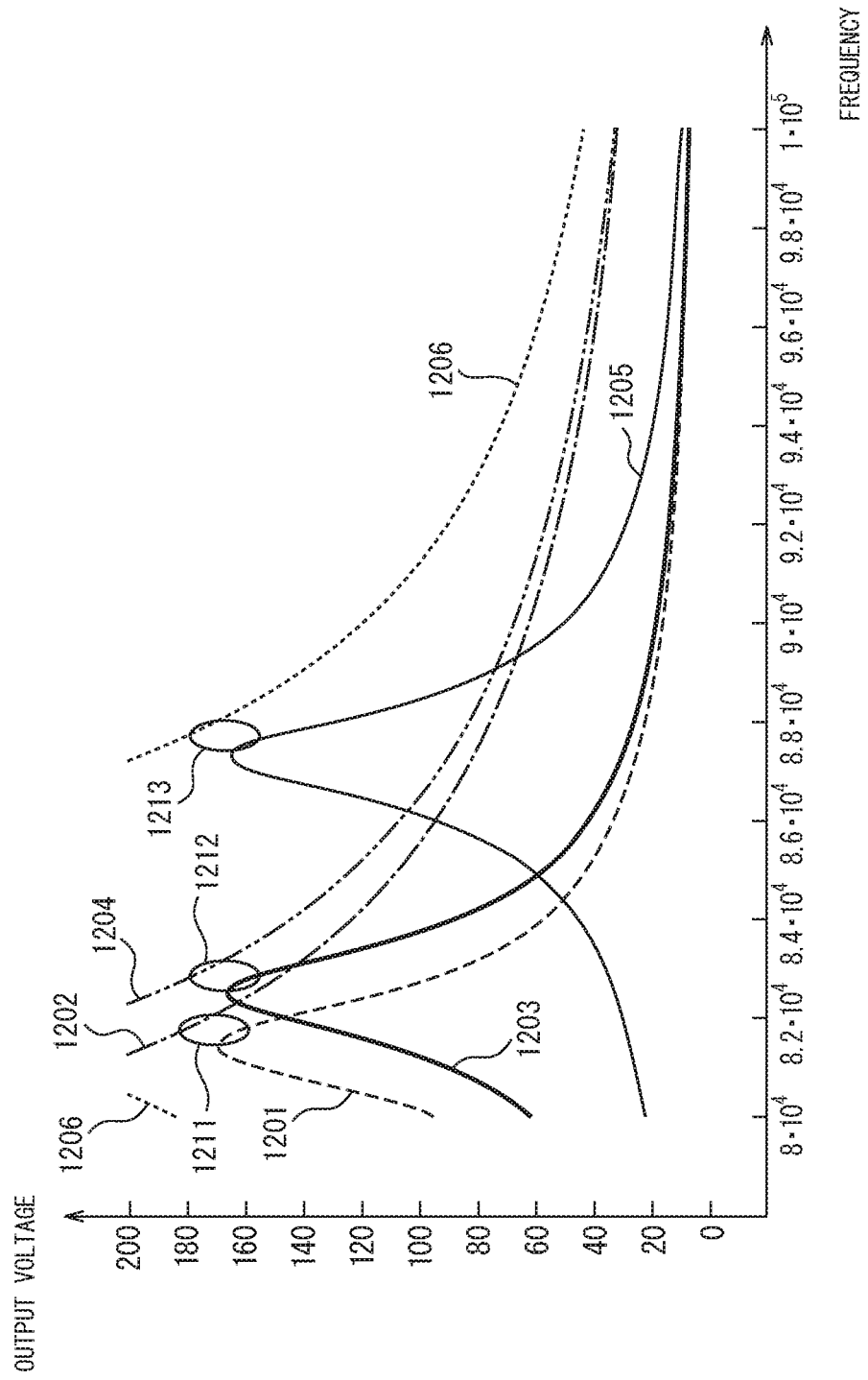
FIG. 12 is a diagram illustrating an example of simulation results of frequency responses of output voltage from the non-contact power supply device according to the other variation when voltage applied to the transmission coil is changed in accordance with the coupling coefficient.

FIG. 12 is a diagram illustrating an example of simulation results of frequency responses of output voltage from the non-contact power supply device according to the variation when voltage applied to the transmission coil 14 is changed in accordance with the coupling coefficient. In FIG. 12, frequency is plotted along the horizontal axis and output voltage is plotted along the vertical axis. Graph 1201 represents a frequency response of the output voltage when the coupling coefficient k is set as k=0.15, the AC equivalent resistance of a load circuit 28 is set at Rac, and the voltage applied to the transmission coil 14 is set at Vin. In addition, graph 1202 represents a frequency response of the output voltage when the coupling coefficient k is set as k=0.15, the AC equivalent resistance of the load circuit 28 is set at (10*Rac), and the voltage applied to the transmission coil 14 is set at Vin. In addition, graph 1203 represents a frequency response of the output voltage when the coupling coefficient k is set as k=0.3, the AC equivalent resistance of the load circuit 28 is set at Rac, and the voltage applied to the transmission coil 14 is set at (0.48*Vin). In addition, graph 1204 represents a frequency response of the output voltage when the coupling coefficient k is set as k=0.3, the AC equivalent resistance of the load circuit 28 is set at (10*Rac), and the voltage applied to the transmission coil 14 is set at (0.48*Vin). Further, graph 1205 represents a frequency response of the output voltage when the coupling coefficient k is set as k=0.6, the AC equivalent resistance of the load circuit 28 is set at Rac, and the voltage applied to the transmission coil 14 is set at (0.22*Vin). In addition, graph 1206 represents a frequency response of the output voltage when the coupling coefficient k is set as k=0.6, the AC equivalent resistance of the load circuit 28 is set at (10*Rac), and the voltage applied to the transmission coil 14 is set at (0.22*Vin). Note that, in the simulation, it is assumed that Lp=174 µH, Cr1=2 µF, Cp=25 nF, L1=240 µH, L2=1300 µH, Ri=Ris=0.3Ω, n=1, Ro=150Ω, and Vin=800 V.

In this case, although variation in the output voltage due to change in the resistance of the load circuit 28 is larger than the variation in the above-described embodiment, there exists a frequency at which the variation in the output voltage is suppressed for each coupling coefficient, as illustrated by points 1211 to 1213. In addition, in the variation, an adjustment range of switching frequency of AC power supplied to the transmission coil 14 due to variation in the coupling coefficient also becomes approximately the same as that in the above-described embodiment.

According to still another variation, in conjunction with disposing a coil 23 that is not coupled with a transmission coil 14 even at the time of power transmission in a resonance circuit 20 of a power reception device 3, a coil that is connected in series with the transmission coil 14 of a power transmission device 2 and is not coupled with a reception coil 21 even at the time of power transmission may be disposed.

Figure 13:
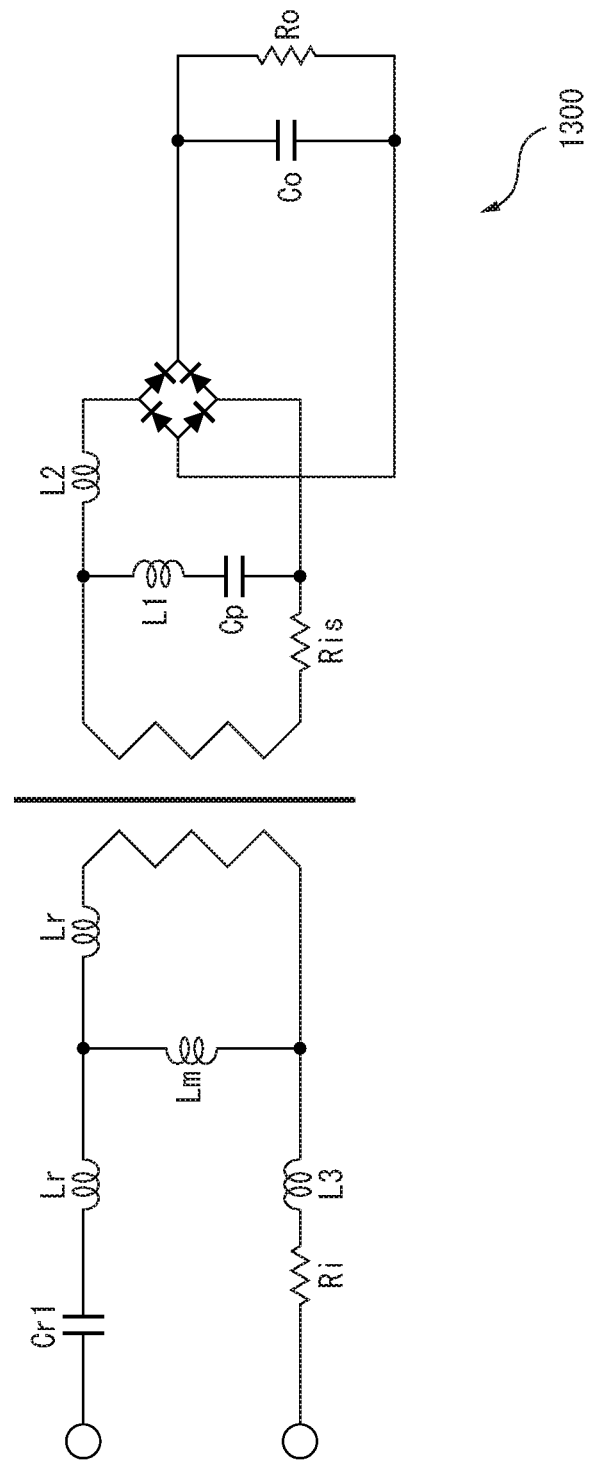
FIG. 13 is an equivalent circuit diagram of a non-contact power supply device according to still another variation.

FIG. 13 is an equivalent circuit diagram of a non-contact power supply device according to the variation. An equivalent circuit 1300 illustrated in FIG. 13 differs from the equivalent circuit 900 illustrated in FIG. 9, which includes, in the resonance circuit 20 of the power reception device 3, a coil (corresponding to inductance L1) that is connected in series with the resonance capacitor 22 and is not coupled with the transmission coil 14, in that a coil that corresponds to inductance L3 and is not coupled with the reception coil 21 even at the time of power transmission is disposed in such a manner as to be connected in series with the transmission coil 14.

Figure 14:
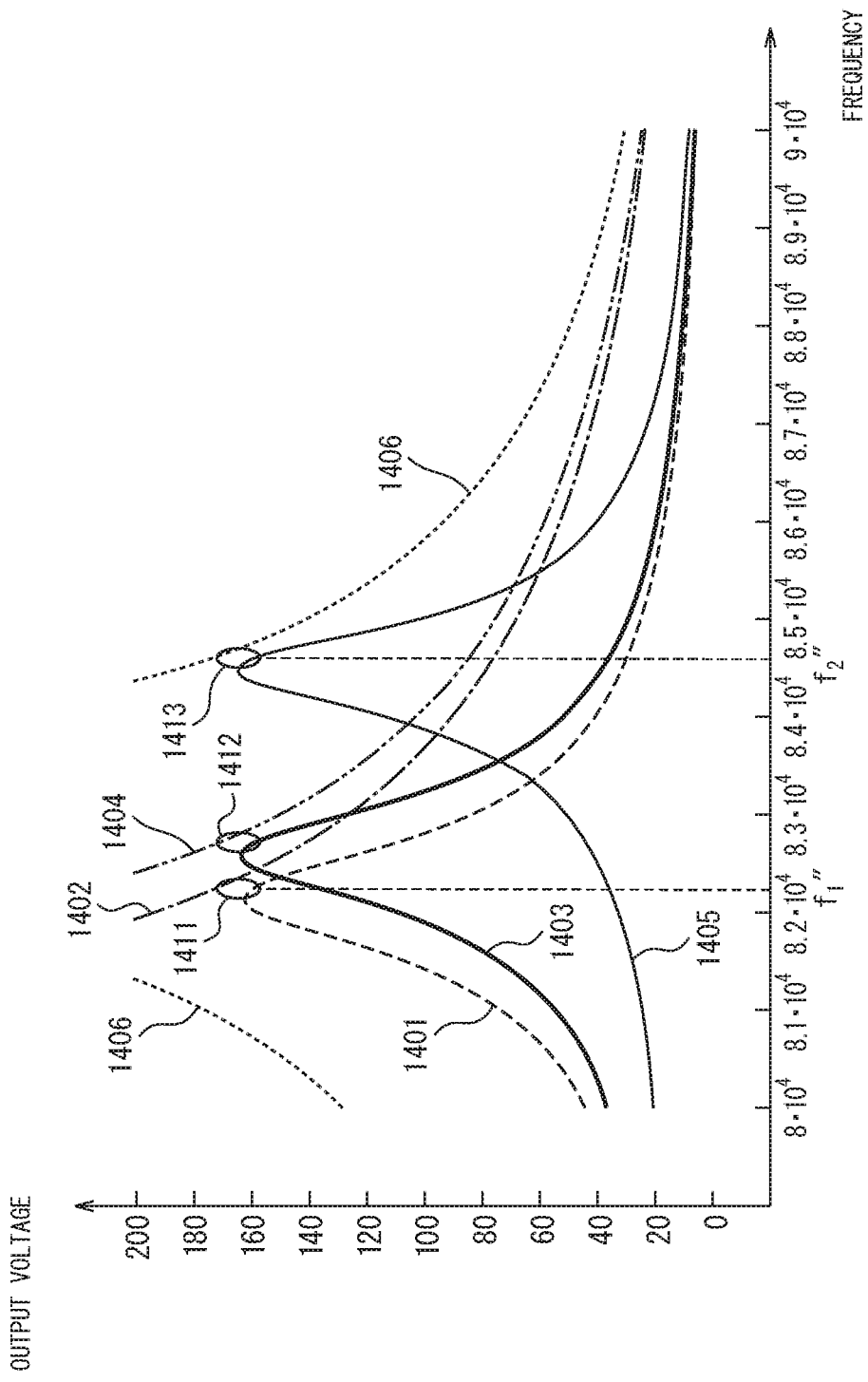
FIG. 14 is a diagram illustrating an example of simulation results of frequency responses of output voltage from the non-contact power supply device according to the still another variation when voltage applied to the transmission coil is changed in accordance with the coupling coefficient.

FIG. 14 is a diagram illustrating an example of simulation results of frequency responses of output voltage from the non-contact power supply device according to the variation when voltage applied to the transmission coil 14 is changed in accordance with the coupling coefficient. In FIG. 14, frequency is plotted along the horizontal axis and output voltage is plotted along the vertical axis. Graph 1401 represents a frequency response of the output voltage when the coupling coefficient k is set as k=0.15, the AC equivalent resistance of a load circuit 28 is set at Rac, and the voltage applied to the transmission coil 14 is set at Vin. In addition, graph 1402 represents a frequency response of the output voltage when the coupling coefficient k is set as k=0.15, the AC equivalent resistance of the load circuit 28 is set at (10*Rac), and the voltage applied to the transmission coil 14 is set at Vin. In addition, graph 1403 represents a frequency response of the output voltage when the coupling coefficient k is set as k=0.3, the AC equivalent resistance of the load circuit 28 is set at Rac, and the voltage applied to the transmission coil 14 is set at (0.48*Vin). In addition, graph 1404 represents a frequency response of the output voltage when the coupling coefficient k is set as k=0.3, the AC equivalent resistance of the load circuit 28 is set at (10*Rac), and the voltage applied to the transmission coil 14 is set at (0.48*Vin). Further, graph 1405 represents a frequency response of the output voltage when the coupling coefficient k is set as k=0.6, the AC equivalent resistance of the load circuit 28 is set at Rac, and the voltage applied to the transmission coil 14 is set at (0.22*Vin). In addition, graph 1406 represents a frequency response of the output voltage when the coupling coefficient k is set as k=0.6, the AC equivalent resistance of the load circuit 28 is set at (10*Rac), and the voltage applied to the transmission coil 14 is set at (0.22*Vin). Note that, in the simulation, it is assumed that Lp=174 μH, Cr1=2 μF, Cp=9.2 nF, L1=260 μH, L2=1000 μH, L3=180 μH, Ri=Ris=0.3Ω, n=1, Ro=150Ω, and Vin=800 V.

In the variation, as illustrated by points 1411 to 1413, there also exists a frequency at which variation in the output voltage is suppressed for each coupling coefficient. Further, in the variation, an adjustment range of switching frequency of AC power supplied to the transmission coil 14 from frequency f1" corresponding to the point 1411 to frequency f2" corresponding to the point 1413 due to variation in the coupling coefficient can be made further narrower than the adjustment range of switching frequency according to the above-described embodiment (the range from the frequency f1 to the frequency f2 illustrated in FIG. 7).

Note that, in the above-described respective variations, as with the above-described embodiment, the control circuit 18 of the power transmission device 2 is also capable of, by adjusting the switching frequency and voltage of the AC power supplied from the power supply circuit 10 to the transmission coil 14, in accordance with received determination information, making the non-contact power supply device perform a constant voltage output operation even when the coupling coefficient does not stay constant.

In addition, the inventors have discovered that when the resistance of the load circuit of the power reception device has a preset value, the input impedance of the non-contact power supply device according to the above-described embodiment or its variations has a local minimum value at a frequency at which the non-contact power supply device performs constant voltage output operation.

Figure 15:
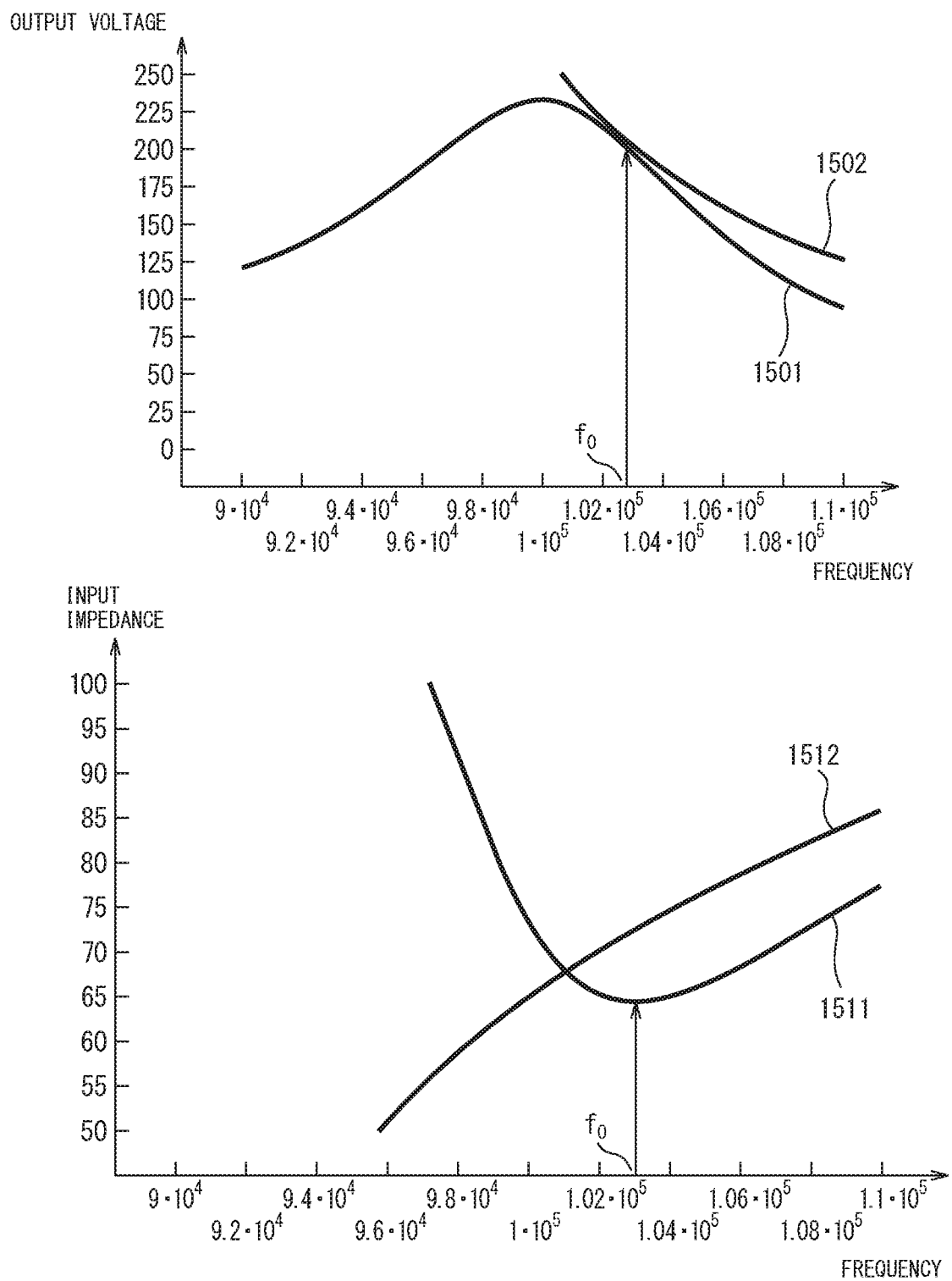
FIG. 15 is a diagram illustrating an example of a relationship between frequency responses of the output voltage and frequency responses of input impedance of the non-contact power supply device.

FIG. 15 is a diagram illustrating an example of a relationship between frequency responses of output voltage from and frequency responses of input impedance of the non-contact power supply device according to the SPL method. In the upper side graph in FIG. 15, frequency is plotted along the horizontal axis and output voltage is plotted along the vertical axis. In addition, in the lower side graph in FIG. 15, frequency is plotted along the horizontal axis and input impedance is plotted along the vertical axis. Note that, in the simulation, the same values as the values of parameters of the respective circuit elements used in the simulation illustrated in FIG. 2 were used. In the upper side graph, graph 1501 (the same as the graph 203 in FIG. 2) represents a frequency response of the output voltage from the non-contact power supply device 1 when the coupling coefficient k is set as k=0.3 and the AC equivalent resistance of the load circuit 27 is set at Rac. In addition, graph 1502 (the same as the graph 204 in FIG. 2) represents a frequency response of the output voltage from the non-contact power supply device 1 when the coupling coefficient k is set as k=0.3 and the AC equivalent resistance of the load circuit 27 is set at (10*Rac). In addition, in the lower side graph, graph 1511 represents a frequency response of the input impedance of the non-contact power supply device 1 when the coupling coefficient k is set as k=0.3 and the AC equivalent resistance of the load circuit 27 is set at Rac. Further, graph 1512 represents a frequency response of the input impedance of the non-contact power supply device 1 when the coupling coefficient k is set as k=0.3 and the AC equivalent resistance of the load circuit 27 is set at (100*Rac).

As illustrated in FIG. 15, at frequency f0 at which the non-contact power supply device 1 performs constant voltage output operation, the input impedance when the AC equivalent resistance of the load circuit 27 is set at Rac has a local minimum value. In other words, current flowing through the transmission coil 14 has a local maximum value at the frequency f0.

Thus, according to a variation, the control circuit of the power transmission device may determine whether or not the non-contact power supply device performs constant voltage output operation, on the basis of a frequency response of current flowing through the transmission coil.

Figure 16:
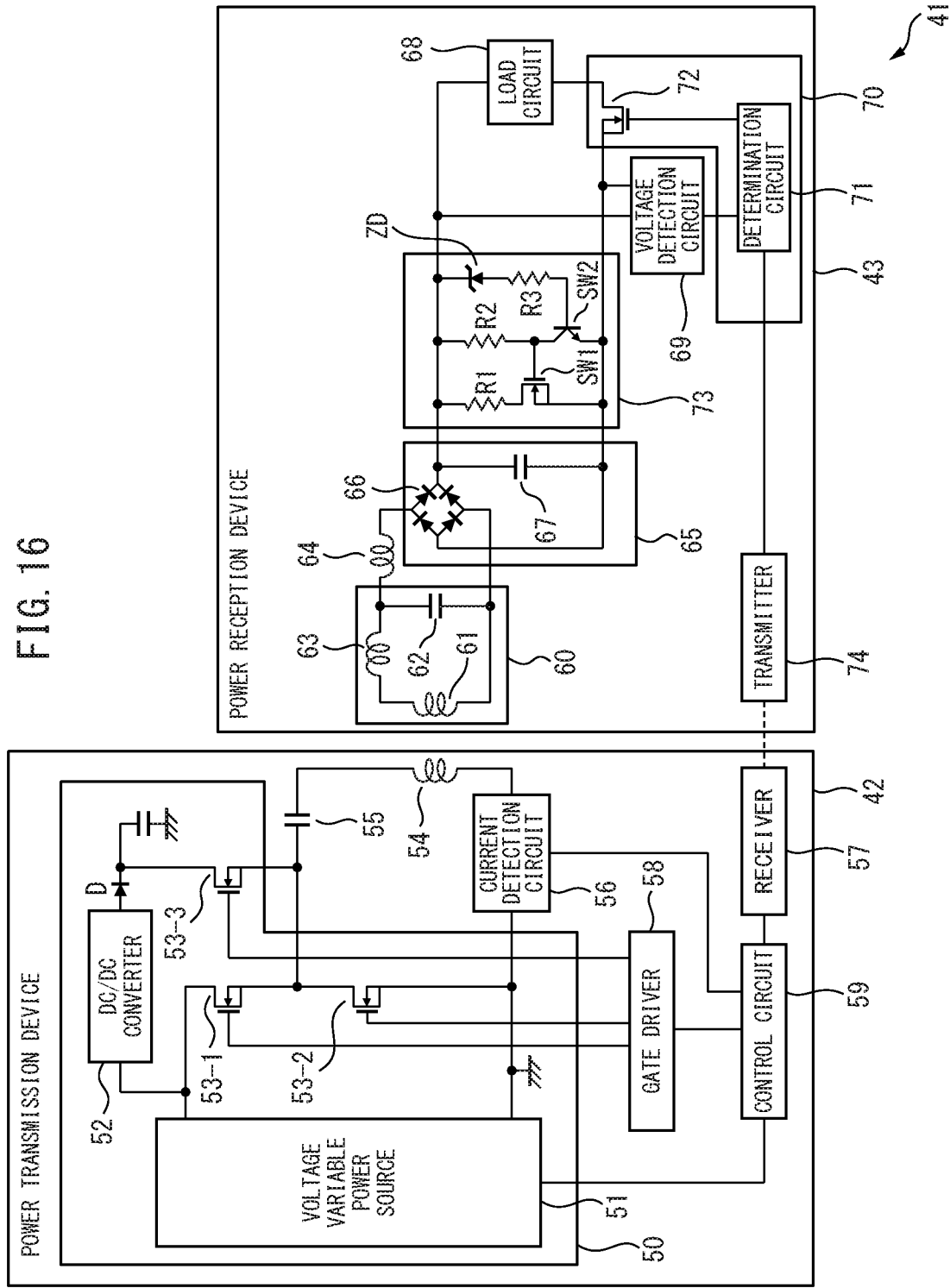
FIG. 16 is a schematic configuration view of a non-contact power supply device according to a variation.

FIG. 16 is a schematic configuration view of a non-contact power supply device according to the variation. As illustrated in FIG. 16, a non-contact power supply device 41 includes a power transmission device 42 and a power reception device 43 to which power is transmitted from the power transmission device 42 through space without contact. The power transmission device 42 includes a power supply circuit 50, a transmission coil 54, a capacitor 55, a current detection circuit 56, a receiver 57, a gate driver 58, and a control circuit 59. On the other hand, the power reception device 43 includes a resonance circuit 60 including a reception coil 61, a resonance capacitor 62, and a coil 63, a coil 64, a rectification and smoothing circuit 65 including a full-wave rectification circuit 66 and a smoothing capacitor 67, a load circuit 68, a voltage detection circuit 69, a constant voltage determination circuit 70, a fixed load circuit 73, and a transmitter 74.

The non-contact power supply device 41 differs from the non-contact power supply device 1 illustrated in FIG. 4, with respect to the power transmission device 42, in the configuration of the power supply circuit 50, in including the current detection circuit 56, and in a portion of control performed by the control circuit 59. In addition, with respect to the power reception device 43, the non-contact power supply device 41 differs from the non-contact power supply device 1 in including the fixed load circuit 73. Therefore, the above-described differences and related matters will be described below.

The power supply circuit 50 supplies the transmission coil 54 with AC power having adjustable switching frequency and adjustable voltage. To that end, the power supply circuit 50 includes a voltage variable power source 51, a DC/DC converter 52, and three switching elements 53-1 to 53-3.

The voltage variable power source 51 is a power source that supplies DC power and is capable of adjusting the voltage of the DC power in accordance with control from the control circuit 59. Note that the voltage variable power source 51 may have any of various circuit configurations that are capable of adjusting the voltage to be supplied. While the non-contact power supply device 41 is performing a constant voltage output operation, the DC power supplied from the voltage variable power source 51 is converted into AC power through the switching elements 53-1 and 53-2 and supplied to the transmission coil 54. On the other hand, while adjustment of switching frequency for the non-contact power supply device 41 to perform a constant voltage output operation is being carried out, the DC power supplied from the voltage variable power source 51 is supplied to the transmission coil 54 via the DC/DC converter 52 and the switching element 53-3.

The input terminal of the DC/DC converter 52 is connected to the positive electrode terminal of the voltage variable power source 51, and the output terminal of the DC/DC converter 52 is connected to one end of the capacitor 55 via a diode D and the switching element 53-3. The DC/DC converter 52 reduces the voltage of the DC power supplied from the voltage variable power source 51 to a predetermined voltage (for example, 5 V).

While adjustment of switching frequency for the non-contact power supply device 41 to perform constant voltage output operation is being carried out, the voltage output from the DC/DC converter 52 is supplied to the transmission coil 54 via the diode D, the switching element 53-3, and the capacitor 55.

For each of the switching elements 53-1 to 53-3, for example, an n-channel MOSFET can be used. The switching elements 53-1 and 53-2 are connected in series between the positive electrode terminal and negative electrode terminal of the voltage variable power source 51. In addition, the switching element 53-1 is connected to the positive electrode side of the voltage variable power source 51, whereas the switching element 53-2 is connected to the negative electrode side of the voltage variable power source 51. The drain terminal of the switching element 53-1 is connected to the positive electrode terminal of the voltage variable power source 51, and the source terminal of the switching element 53-1 is connected to the drain terminal of the switching element 53-2. In addition, the source terminal of the switching element 53-1 and the drain terminal of the switching element 53-2 are connected to one end of the transmission coil 54 via the capacitor 55. Further, the source terminal of the switching element 53-2 is connected to the negative electrode terminal of the voltage variable power source 51 and the other end of the transmission coil 54 via the current detection circuit 56.

In addition, the drain terminal of the switching element 53-3 is connected to the output terminal of the DC/DC converter 52, and the source terminal of the switching element 53-3 is connected to one end of the transmission coil 54 via the capacitor 55. The gate terminals of the switching elements are connected to the gate driver 58.

While the non-contact power supply device 41 is performing a constant voltage output operation, the gate driver 58 keeps the switching element 53-3 in the off state in accordance with a control signal from the control circuit 59. In addition, the gate driver 58 alternately switches the switching elements 53-1 and 53-2 between on and off states at a switching frequency at which constant voltage output operation is performed, in accordance with a control signal from the control circuit 59. In other words, when the switching element 53-1 is turned on and the switching element 53-2 is turned off, current flows to the transmission coil 54 in association with power being supplied from the voltage variable power source 51 through the switching element 53-1 to the capacitor 55 and the capacitor 55 being charged. On the other hand, when the switching element 53-1 is turned off and the switching element 53-2 is turned on, the capacitor 55 is discharged and current flows from the capacitor 55 to the transmission coil 54.

In addition, while adjustment of switching frequency for the non-contact power supply device 41 to perform constant voltage output operation is performed, the gate driver 58 keeps the switching element 53-1 in the off state in accordance with a control signal from the control circuit 59 and, in turn, alternately switches the switching elements 53-3 and the switching element 53-2 between on and off states at the switching frequency in accordance with a control signal from the control circuit 59.

The capacitor 55 is connected between the transmission coil 54 and the power supply circuit 50. The capacitor 55 supplies the transmission coil 54 with AC power having the switching frequency by repeating being charged and discharged in response to switching of the switching elements between on and off states at the switching frequency. Note that it is preferable that the capacitance of the capacitor 55 be set in such a way that the resonance frequency of the transmission coil 54 and the capacitor 55 is lower than the resonance frequency of the resonance circuit 60 of the power reception device 43 and the lower limit frequency of a frequency range in which the switching frequency is adjusted so that the transmission coil 54 and the capacitor 55 do not operate as a resonance circuit in the frequency range in which the switching frequency is adjusted.

The current detection circuit 56 is connected between the transmission coil 54 and the power supply circuit 50 and measures current flowing through the transmission coil 54. The current detection circuit 56 outputs a measured value of the current to the control circuit 59. Note that the current detection circuit 56 may be connected to the transmission coil 54 in parallel with the capacitor 55 in conjunction with a capacitor for diversion (not illustrated) connected in series with the current detection circuit 56. In this case, the current detection circuit 56 is able to indirectly measure the current flowing through the transmission coil 54.

In addition, the constant voltage determination circuit 70 of the power reception device 43 includes a determination circuit 71 and a switching element 72 that are similar to the determination circuit 30 and the switching element 31 according to the above-described embodiment, respectively.

While measured values of the output voltage from the resonance circuit 60 measured by the voltage detection circuit 69 fall within the allowance range of voltage, i.e., the non-contact power supply device 40 is performing a constant voltage output operation, the determination circuit 71 of the constant voltage determination circuit 70 turns on the switching element 72 and thereby causes the output voltage from the resonance circuit 60 to be supplied to the load circuit 68 via the rectification and smoothing circuit 65. On the other hand, when measured values of the output voltage are out of the allowance range of voltage, the determination circuit 71 turns off the switching element 72, thereby causing the output voltage from the resonance circuit 60 not to be supplied to the load circuit 68.

The fixed load circuit 73 is connected to the rectification and smoothing circuit 65 in parallel with the load circuit 68 and, while adjustment of the switching frequency is being performed, provides the power reception device 43 with a load that is substantially equal to a load serving as a reference for the load circuit 68 (for example, Rac in the simulation illustrated in FIG. 15). To that end, the fixed load circuit 73 is connected to the rectification and smoothing circuit 65 in parallel with the load circuit 68 and includes a resistor R1 that has a resistance corresponding to the load serving as a reference for the load circuit 68. The resistor R1 is connected in series with a switching element SW1, which is an n-channel MOSFET. Further, the fixed load circuit 73 includes, between both output terminals of the rectification and smoothing circuit 65, a resistor R2 and a switching element SW2, which is an npn bipolar transistor, that are connected in series in this order from the positive electrode side. In addition, the resistor R2 and the switching element SW2 are connected in parallel with the resistor R1. The gate terminal of the switching element SW1 is connected between the resistor R2 and one end (in this example, the collector terminal) of the switching element SW2. Further, the base terminal of the switching element SW2 is connected to the positive electrode terminal of the rectification and smoothing circuit 65 via a resistor R3 and a Zener diode ZD, which is reverse-biased.

While the non-contact power supply device 41 is performing a constant voltage output operation, the output voltage from the resonance circuit 60 is higher than the breakdown voltage of the Zener diode ZD and, as a result, current is supplied to the base terminal of the switching element SW2 via the Zener diode ZD and the resistor R3, turning on the switching element SW2. Consequently, the voltage applied to the gate terminal of the switching element SW1 decreases and the switching element SW1 is thereby turned off. Therefore, the output voltage from the resonance circuit 60 is not applied to the resistor RI.

On the other hand, since, while the adjustment of the switching frequency in order for the non-contact power supply device 41 to perform a constant voltage output operation is being performed, the voltage of power supplied from the DC/DC converter 52 to the transmission coil 54 is low, the power supplied from the power transmission device 42 to the power reception device 43 also decreases. Therefore, the output voltage from the resonance circuit 60 also decreases to a voltage lower than the breakdown voltage of the Zener diode ZD. As a result, the switching element SW2 is turned off, and, in association therewith, the voltage applied to the gate terminal of the switching element SW1 increases and the switching element SW1 is thereby turned on. Thus, the output voltage from the resonance circuit 60 is applied to the resistor R1. As a result, a fixed load that the resistor R1 has is provided to the power reception device 43.

Operation of the control circuit 59 of the power transmission device 42 according to the variation will be described below. While the non-contact power supply device 41 performs constant voltage output operation, the control circuit 59, as with the above-described embodiment, controls the voltage variable power supply 51 of the power supply circuit 50 to supply the transmission coil 54 with DC voltage having a voltage in accordance with switching frequency in such a way that a measured value of the output voltage from the resonance circuit 60 of the power reception device 43 falls within a predetermined allowance range. In addition, the control circuit 59 keeps the switching element 53-3 in the off state and, in conjunction therewith, switches the switching elements 53-1 and 53-2 between on and off states at a switching frequency at which constant voltage output operation is performed, via the gate driver 58.

On the other hand, when determination information included in a wireless signal received from the power reception device 43 via the receiver 57 indicates that the non-contact power supply device 41 is not performing a constant voltage output operation, the control circuit 59 keeps the switching element 53-1 in the off state and, in conjunction therewith, alternately switches the switching elements 53-3 and 53-2 between on and off states via the gate driver 58 and thereby causes power to be supplied from the DC/DC converter 52 to the transmission coil 54. In addition, the control circuit 59 controls the voltage variable power source 51 in such a way that the voltage supplied from the DC/DC converter 52 to the transmission coil 54 has a predetermined value. Through this control, the control circuit 59 reduces the power supplied from the power transmission device 42 to the power reception device 43 to a level at which voltage is applied to the resistor R1 of the fixed load circuit 73 of the power reception device 43.

The control circuit 59 monitors measured values of current flowing through the transmission coil 54 measured by a current detection circuit 56 while the switching frequency is changed and detects a switching frequency at which the measured values of the current have a local maximum. The switching frequency at which measured values of the current flowing through the transmission coil 54 have a local maximum is a frequency at which the input impedance of the non-contact power supply device 41 has a local minimum value, i.e., a frequency at which the non-contact power supply device 41 performs a constant voltage output operation, such as the frequency f0 illustrated in FIG. 15. Thus, when a switching frequency at which measured values of the current flowing through the transmission coil 54 have a local maximum is detected, the control circuit 59 controls switching of the switching elements 53-1 and 53-2 between on and off states via the gate driver 58 at the switching frequency in such a way that power from the voltage variable power source 51 is supplied to the transmission coil 54. In addition, the control circuit 59 turns off the switching element 53-3. This operation enables the control circuit 59 to make the non-contact power supply device 41 perform constant voltage output operation. In addition, as described above, the control circuit 59 controls the voltage variable power supply 51 of the power supply circuit 50 to supply the transmission coil 54 with DC voltage having a voltage in accordance with the switching frequency in such a way that measured values of the output voltage from the resonance circuit 60 of the power reception device 43 fall within a predetermined allowance range.

According to the variation, the control circuit of the power transmission device is capable of, by monitoring current flowing through the transmission coil of the power transmission device, detecting a switching frequency at which the non-contact power supply device performs a constant voltage output operation.

Note that, in the variation illustrated in FIG. 16, as with the variation illustrated in FIG. 9, the coil 63 that is not coupled with the transmission coil 54 even at the time of power transmission may be connected in series with the resonance capacitor 62 and in parallel with the reception coil 61 in the resonance circuit 60 of the power reception device 43. Alternatively, as with the variation illustrated in FIG. 11 or 13, in conjunction with disposing a coil that is not coupled with the transmission coil 54 or in place of disposing the coil in the resonance circuit 60 of the power reception device 43, a coil that is connected in series with the transmission coil 54 and is not coupled with the reception coil 61 even at the time of power transmission may be disposed in the power transmission device 42. In this case, the control circuit of the power transmission device is also capable of detecting a switching frequency at which the non-contact power supply device performs a constant voltage output operation by monitoring the current flowing through the transmission coil of the power transmission device.

According to another variation, in the power transmission device, the power supply circuit that supplies AC power to the transmission coil may have a circuit configuration different from that in the above-described embodiment and its variations, as long as the power supply circuit is a circuit that can variably adjust the switching frequency and voltage applied to the transmission coil.

Figure 17A:
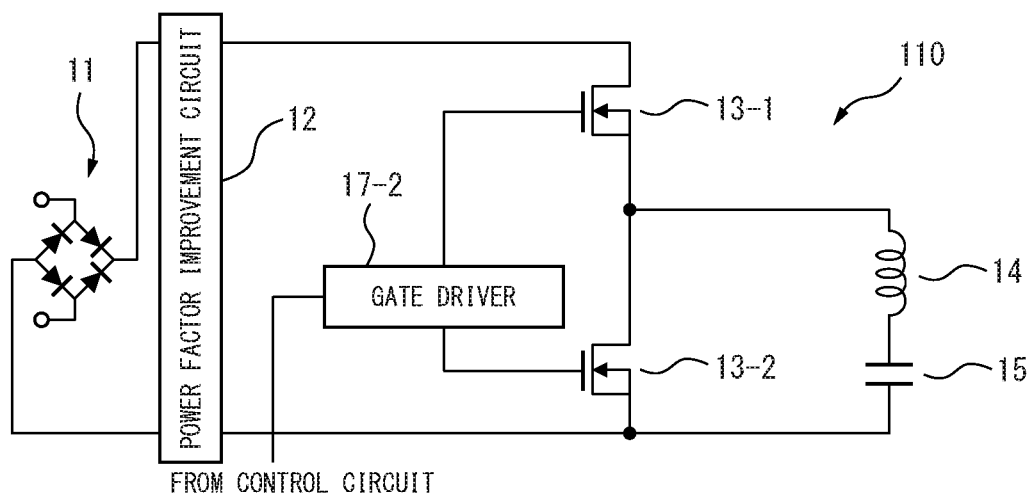
FIG. 17A is a circuit diagram of a power supply circuit according to a variation.
Figure 17B:
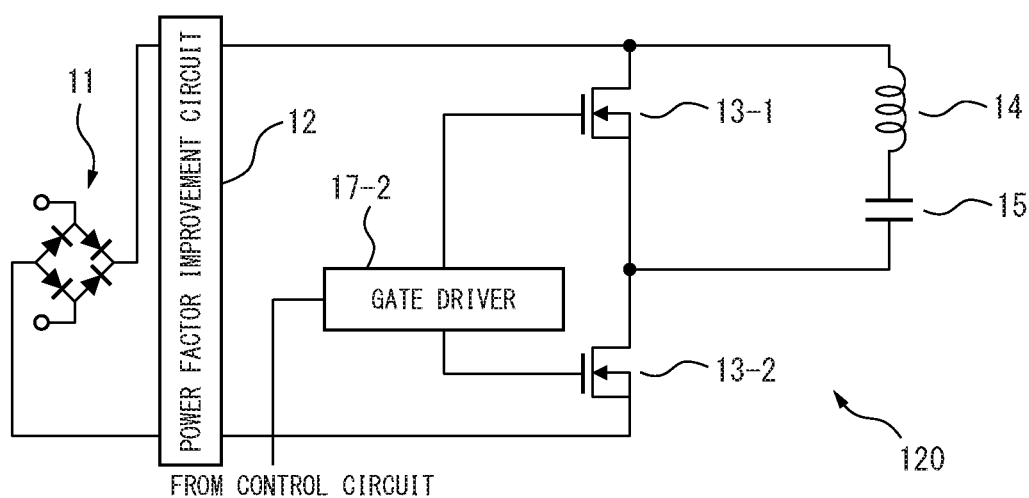
FIG. 17B is a circuit diagram of a power supply circuit according to another variation.

FIGS. 17A and 17B are respectively circuit diagrams of power supply circuits according to the variation.

A power supply circuit 110 illustrated in FIG. 17A includes a power source 11, a power factor improvement circuit 12, two switching elements 13-1 and 13-2, and a capacitor 15 for blocking DC current that is connected in series with a transmission coil 14. Note that, for the switching elements, for example, n-channel MOSFETs can also be used in this variation. In addition, the power factor improvement circuit 12 can be, for example, configured identical to the power factor improvement circuit 12 in the above-described embodiment.

In this variation, the switching element 13-1 and the switching element 13-2 are connected in series between the positive electrode terminal and negative electrode terminal of the power source 11. In addition, the switching element 13-1 is connected to the positive electrode side of the power source 11, whereas the switching element 13-2 is connected to the negative electrode side of the power source 11. The drain terminal of the switching element 13-1 is connected to the positive electrode terminal of the power source 11 via the power factor improvement circuit 12, and the source terminal of the switching element 13-1 is connected to the drain terminal of the switching element 13-2. In addition, the source terminal of the switching element 13-2 is connected to the negative electrode terminal of the power source 11 via the power factor improvement circuit 12. Further, the source terminal of the switching element 13-1 and the drain terminal of the switching element 13-2 are connected to one end of the transmission coil 14, and the source terminal of the switching element 13-2 is connected to the other end of the transmission coil 14 via the capacitor 15. In addition, the gate terminals of the switching elements are connected to a gate driver 17-2.

In this variation, the gate driver 17-2 may alternately switch the switching element 13-1 and the switching element 13-2 between on and off states in accordance with a control signal from a control circuit. In other words, when the switching element 13-1 is turned on and the switching element 13-2 is turned off, current flows from the power source 11 to the transmission coil 14 via the power factor improvement circuit 12 and the switching element 13-1 and the capacitor 15 is charged. On the other hand, when the switching element 13-1 is turned off and the switching element 13-2 is turned on, the capacitor 15 is discharged and current flows from the capacitor 15 via the transmission coil 14 and the switching element 13-2. In this variation, therefore, the control circuit may control the switching frequency at which the switching element 13-1 and the switching element 13-2 are switched between on and off states via the gate driver 17-2, depending on determination information received from a power reception device 3.

A power supply circuit 120 illustrated in FIG. 17B, as with the power supply circuit 110, includes a power source 11, a power factor improvement circuit 12, two switching elements 13-1 and 13-2, and a capacitor 15 connected in series with a transmission coil 14. Note that, in the power supply circuit 120, compared with the power supply circuit 110, one end of the transmission coil 14 is connected to the positive electrode terminal of the power source 11 via the power factor improvement circuit 12 and the other end of the transmission coil 14 is connected to the source terminal of the switching element 13-1 and the drain terminal of the switching element 13-2 via the capacitor 15.

In this variation, the gate driver 17-2 may also alternately switch the switching element 13-1 and the switching element 13-2 between on and off states in accordance with a control signal from a control circuit.

Note that, with respect to the power supply circuit 110 illustrated in FIG. 17A and the power supply circuit 120 illustrated in FIG. 17B, it is preferable that the capacitance of the capacitor 15 be set in such a way that the resonance frequency of the transmission coil 14 and the capacitor 15 is lower than the resonance frequency of a resonance circuit 20 of the power reception device 3 and the lower limit frequency of a frequency range in which the switching frequency is adjusted so that the transmission coil 14 and the capacitor 15 do not operate as a resonance circuit within the frequency range in which the switching frequency is adjusted.

In addition, in the above-described embodiment or the variation illustrated in FIG. 9, 11, or 13, the capacitor 15 for blocking DC current connected in series with the transmission coil 14 may be omitted.

Further, in the embodiment illustrated in FIG. 4 and the variations illustrated in FIGS. 9, 11, 17A, and 17B, a voltage variable power source may be used in place of the power source and the power factor improvement circuit, as illustrated in FIG. 16. Conversely, in the variation illustrated in FIG. 16, the power source and the power factor improvement circuit in the embodiment illustrated in FIG. 4 may be used in place of the voltage variable power source. Further, in the variation illustrated in FIG. 16, the voltage variable power source 51 may be configured in such a manner as to be able to supply the transmission coil 54 with power having a predetermined voltage while the switching frequency is adjusted. In this case, the DC/DC converter 52 and the switching element 53-3 may be omitted.

In addition, when it is possible to connect the receiver 16 of the power transmission device 2 and the transmitter 33 of the power reception device 3 to each other in a wired manner, each of the receiver 16 and the transmitter 33 may include a communication circuit capable of communicating a signal including determination information in a wired manner.

As explained above, a person skilled in the art could apply various alterations suitable to embodiments without departing from the scope of the present invention.

REFERENCE SIGNS LIST 1, 41 Non-contact power supply device
2, 42 Power transmission device
10, 110, 120 Power supply circuit
11 Power source
12 Power factor improvement circuit
51 Voltage variable power source
52 DC/DC converter
13-1 to 13-4, 53-1 to 53-3 Switching element
14, 54 Transmission coil
15, 55 Capacitor
56 Current detection circuit
16, 57 Receiver
17-1, 17-2, 58 Gate driver
18, 59 Control circuit
3, 43 Power reception device
20, 60 Resonance circuit
21, 61 Reception coil
22, 62 Resonance capacitor
23, 24, 63, 64 Coil
25, 65 Rectification and smoothing circuit
26, 66 Full-wave rectification circuit
27, 67 Smoothing capacitor
28, 68 Load circuit
29, 69 Voltage detection circuit
30, 70 Constant voltage determination circuit
31, 71 Determination circuit
32, 72 Switching element
73 Fixed load circuit
33, 74 Transmitter
111 AC power source

The invention claimed is:

1. A non-contact power supply device comprising a power transmission device and a power reception device to which power is transmitted from the power transmission device without contact, wherein the power reception device comprises:

a resonance circuit that includes a reception coil that receives power from the power transmission device, a resonance capacitor that is connected in parallel with the reception coil, and a first coil that is connected between the reception coil and the resonance capacitor;

a rectification circuit that rectifies power output from the resonance circuit; and a second coil that is connected in series with the reception coil between the resonance circuit and the rectification circuit and is connected so that the reception coil, the first coil and the second coil are arranged in this order, a voltage detection circuit that measures output voltage of power output from the rectification circuit and obtains a measured value of the output voltage;

a constant voltage determination circuit that includes a switching element that is connected between the rectification circuit and a load circuit connected to the rectification circuit; and a transmitter that transmits a signal including determination information indicating whether or not the non-contact power supply device is performing a constant voltage output operation and whether or not the measured value of the output voltage falls within a predetermined allowance range of voltage to the power transmission device, wherein the power transmission device comprises:

a transmission coil that supplies power to the power reception device; and a power supply circuit that supplies AC power having an adjustable switching frequency and having an adjustable voltage to the transmission coil, a receiver that receives the signal including the determination information; and a control circuit that controls the adjustable switching frequency and voltage of the AC power supplied from the power supply circuit to the transmission coil depending on the determination information, and wherein the constant voltage determination circuit determines, based upon the measured value of the output voltage, whether or not the non-contact power supply device is performing the constant voltage output operation by switching the switching element between on and off states at a predetermined period while the adjustable switching frequency of the AC power supplied from the power supply circuit to the transmission coil is controlled, and determines whether or not the measured value of the output voltage falls within the predetermined allowance range of voltage.

2. The non-contact power supply device according to claim 1, wherein the first coil is not coupled with the transmission coil even while power is transmitted from the power transmission device to the power reception device.

3. The non-contact power supply device according to claim 1, wherein the control circuit controls, when the determination information indicates that the non-contact power supply device is not performing a constant voltage output operation, the switching frequency of the AC power supplied from the power supply circuit to the transmission coil in such a way that measured values of the output voltage do not change even when resistance of the load circuit changes, and when the determination information indicates that the non-contact power supply device is performing a constant voltage output operation, the control circuit keeps the switching frequency constant.

4. The non-contact power supply device according to claim 3, wherein the control circuit controls, when the determination information indicates that the non-contact power supply device is performing a constant voltage output operation and the measured value of the output voltage does not fall within the predetermined allowance range of voltage, voltage of the AC power supplied from the power supply circuit to the transmission coil in such a way that measured values of the output voltage fall within the predetermined allowance range of voltage.

5. The non-contact power supply device according to claim 1,
wherein the power supply circuit can adjust switching frequency and voltage of AC power supplied to the transmission coil, and
the power transmission device further comprises:
a current detection circuit that measures current flowing through the transmission coil and obtains a measured value of the current; and
a control circuit that controls switching frequency and voltage of the AC power supplied from the power supply circuit to the transmission coil, depending on the measured value of the current.

6. The non-contact power supply device according to claim 5, wherein the control circuit monitors measured values of the current while changing the switching frequency and thereby detects a switching frequency at which measured values of the current have a local maximum and controls the power supply circuit in such a way that AC power having the detected switching frequency is supplied to the transmission coil.

7. A non-contact power supply device comprising a power transmission device and a power reception device to which power is transmitted from the power transmission device without contact,
wherein the power reception device comprises:
a resonance circuit that includes a reception coil that receives power from the power transmission device and a resonance capacitor that is connected in parallel with the reception coil;
a rectification circuit that rectifies power output from the resonance circuit; and
a first coil that is connected in series with the reception coil between the resonance circuit and the rectification circuit, and
wherein the power transmission device comprises:
a transmission coil that supplies power to the power reception device;
a second coil that is connected in series with the transmission coil and is not coupled with the reception coil even while power is transmitted from the power transmission device to the power reception device; and
a power supply circuit that supplies AC power having an adjustable switching frequency and having an adjustable voltage to the transmission coil,
wherein the power reception device further comprises:
a voltage detection circuit that measures output voltage of power output from the rectification circuit and obtains a measured value of the output voltage;
a constant voltage determination circuit that includes a switching element that is connected between the rectification circuit and a load circuit connected to the rectification circuit determines, on the basis of the measured value of the output voltage, whether or not the non-contact power supply device is performing a constant voltage output operation and whether or not the measured value of the output voltage falls within a predetermined allowance range of voltage; and a transmitter that transmits a signal including determination information indicating whether or not the non-contact power supply device is performing the constant voltage output operation and whether or not the measured value of the output voltage falls within the predetermined allowance range of voltage to the power transmission device, and wherein the power transmission device further comprises:

a receiver that receives the signal including the determination information; and a control circuit that controls switching frequency and voltage of the AC power supplied from the power supply circuit to the transmission coil, depending on the determination information, and wherein the constant voltage determination circuit determines, based upon the measured value of the output voltage, whether or not the non-contact power supply device is performing the constant voltage output operation by switching the switching element between on and off states at a predetermined period while the switching frequency of the AC power supplied from the power supply circuit to the transmission coil is controlled, and determines whether or not the measured value of the output voltage falls within the predetermined allowance range of voltage.

* * * * *